United States Patent
He et al.

(10) Patent No.: US 11,010,588 B2
(45) Date of Patent: May 18, 2021

(54) LARGE-SENSING-AREA UNDER-DISPLAY OPTICAL SENSOR

(71) Applicant: Shenzhen Goodix Technology Co., Ltd., Shenzhen (CN)

(72) Inventors: Yi He, San Diego, CA (US); Bo Pi, San Diego, CA (US)

(73) Assignee: Shenzhen Goodix Technology Co., Ltd., Shenzhen (CN)

( * ) Notice: Subject to any disclaimer, the term of this patent is extended or adjusted under 35 U.S.C. 154(b) by 0 days.

(21) Appl. No.: 16/558,309

(22) Filed: Sep. 2, 2019

(65) Prior Publication Data

US 2020/0019749 A1    Jan. 16, 2020

Related U.S. Application Data

(63) Continuation-in-part of application No. 15/708,088, filed on Sep. 18, 2017, now Pat. No. 10,410,033, which is a continuation-in-part of application No. 15/616,856, filed on Jun. 7, 2017, now Pat. No. 10,410,037, which is a continuation-in-part of application No. 15/421,249, which is a continuation-in-part of application No. PCT/US2016/038445, filed on Jun. 20, 2016, now
(Continued)

(51) Int. Cl.
*G06K 9/00* (2006.01)
*F21V 8/00* (2006.01)

(52) U.S. Cl.
CPC ....... *G06K 9/00046* (2013.01); *G02B 6/0018* (2013.01); *G06K 9/0004* (2013.01)

(58) Field of Classification Search
CPC . G06K 9/00046; G06K 9/0004; G02B 6/0018
See application file for complete search history.

(56) References Cited

U.S. PATENT DOCUMENTS

| 5,621,516 A | 4/1997 | Shinzaki et al. |
| 6,429,927 B1 | 8/2002 | Borza |
| | (Continued) | |

FOREIGN PATENT DOCUMENTS

| CN | 2901425 Y | 5/2007 |
| CN | 101802759 A | 8/2010 |
| | (Continued) | |

*Primary Examiner* — John B Strege
(74) *Attorney, Agent, or Firm* — Kilpatrick Townsend & Stockton LLP

(57) ABSTRACT

Optical sensing is provided with a large sensing area in a thin package. For example, embodiments can operate in context of an under-display optical fingerprint sensor integrated into an electronic device, such as a smartphone. Responsive to reflected probe light passing through a display module, a reflective structure is configured to redirect the reflected probe light onto a refractive structure, and the refractive structure is configured to converge the reflected probe light into an input aperture of an optical sensor for detection. Some embodiments operate in context of an enhancement panel having micro-prism structures that tend to blur the reflected probe light. In such context, embodiments are configured for off-axis detection to prefer light passing through only certain micro-prism faces, thereby mitigating blurring.

21 Claims, 23 Drawing Sheets

Related U.S. Application Data

Pat. No. 10,410,036, and a continuation-in-part of application No. PCT/CN2016/104354, filed on Nov. 2, 2016.

(60) Provisional application No. 62/396,153, filed on Sep. 17, 2016, provisional application No. 62/412,777, filed on Oct. 25, 2016, provisional application No. 62/468,337, filed on Mar. 7, 2017, provisional application No. 62/347,073, filed on Jun. 7, 2016, provisional application No. 62/363,832, filed on Jul. 18, 2016, provisional application No. 62/289,328, filed on Jan. 31, 2016, provisional application No. 62/330,833, filed on May 2, 2016, provisional application No. 62/181,718, filed on Jun. 18, 2015, provisional application No. 62/249,832, filed on Nov. 2, 2015.

(56) References Cited

U.S. PATENT DOCUMENTS

| | | | | |
|---|---|---|---|---|
| 2006/0132945 A1* | 6/2006 | Sano | ............... | B29C 43/021 359/883 |
| 2007/0041005 A1* | 2/2007 | Song | ............... | G06K 9/0004 356/71 |
| 2010/0142770 A1* | 6/2010 | Hayasaka | ............ | G06K 9/00013 382/124 |
| 2010/0183200 A1* | 7/2010 | Wu | ................ | G06K 9/00046 382/127 |
| 2012/0092474 A1* | 4/2012 | Mitchell | ............ | G06K 9/00046 348/77 |
| 2015/0286306 A1* | 10/2015 | Abrams | ................ | G06F 3/042 345/175 |
| 2017/0109561 A1* | 4/2017 | Wyrwas | ............ | G06K 9/00046 |
| 2017/0315293 A1* | 11/2017 | Bang | ................ | G02B 6/102 |
| 2018/0005003 A1* | 1/2018 | Ryu | ................. | G06F 3/0421 |
| 2018/0012069 A1* | 1/2018 | Chung | ............... | A61B 5/1172 |
| 2018/0150671 A1* | 5/2018 | Choo | ............... | H01L 27/326 |
| 2018/0150674 A1* | 5/2018 | Ryu | ............... | H01L 27/14678 |
| 2018/0165497 A1* | 6/2018 | Lee | ................ | G06F 3/0412 |
| 2018/0358401 A1* | 12/2018 | Lin | ................ | G06K 9/00013 |
| 2019/0006440 A1* | 1/2019 | Sun | ................ | H01L 27/3234 |
| 2019/0197287 A1* | 6/2019 | Han | ................ | G06K 9/0004 |
| 2020/0019749 A1 | 1/2020 | He et al. | | |

FOREIGN PATENT DOCUMENTS

| | | |
|---|---|---|
| CN | 208580413 U | 3/2019 |
| CN | 109643382 A | 4/2019 |
| KR | 20100036406 A | 4/2010 |
| KR | 20100092173 A | 8/2010 |

\* cited by examiner

LARGE-SENSING-AREA UNDER-DISPLAY OPTICAL SENSOR

CROSS REFERENCE TO RELATED APPLICATIONS

This patent document claims the benefits and priority of, and is a continuation-in-part application of, U.S. patent application Ser. No. 15/708,088, filed on Sep. 18, 2017, which claims the benefits and priorities of U.S. Provisional Patent Application No. 62/396,153, filed on Sep. 17, 2016; U.S. Provisional Patent Application No. 62/412,777, filed on Oct. 25, 2016; and U.S. Provisional Patent Application No. 62/468,337, filed on Mar. 7, 2017.

U.S. patent application Ser. No. 15/708,038 claims the benefits and priority of, and is a continuation in-part application of, U.S. patent application Ser. No. 15/616,856, filed on Jun. 7, 2017, which claims the benefits and priorities of U.S. Provisional Patent Application No. 62/347,073, filed on Jun. 7, 2016; U.S. Provisional Patent Application No. 62/363,832, filed on Jul. 18, 2016, and U.S. Provisional Patent Application No. 62/363,823, filed on Jul. 18, 2016. In addition, U.S. patent application Ser. No. 15/616,856 claims the benefits and priority of, and is a continuation-in-part application of, U.S. patent application Ser. No. 15/421,249, filed on Jan. 31, 2017, which claims the benefits and priorities of U.S. Provisional Patent Application No. 62/289,328, filed on Jan. 31, 2016; U.S. Provisional Patent Application No. 62/330,833, filed on May 2, 2016, and U.S. Provisional Patent Application No. 62/347,073, filed on Jun. 7, 2016. Furthermore, U.S. patent application Ser. No. 15/616,856 claims the benefits and priority of, and is a continuation-in-part application of International Patent Application No. PCT/US2016/038445, filed on Jun. 20, 2016, which claims the benefits and priority of U.S. Provisional Patent Application No. 62/181,718, filed on Jun. 18, 2015.

U.S. patent application Ser. No. 15/708,038 also claims the benefits and priority of, and is a continuation-in-part application of, U.S. patent application Ser. No. 15/421,249, filed on Jan. 31, 2017, which claims the benefits and priorities of U.S. Provisional Patent Application No. 62/289,328, filed on Jan. 31, 2016, U.S. Provisional Patent Application No. 62/330,833, filed on May 2, 2016; and U.S. Provisional Patent Application No. 62/347,073, filed on Jun. 7, 2016. In addition, U.S. patent application Ser. No. 15/421,249 claims the benefits and priority of, and is a continuation-in-part application of, International Patent Application No. PCT/US2016/038445, filed on Jun. 20, 2016, which claims die benefits and priority of U.S. Provisional Patent Application No. 62/181,718, filed on Jun. 18, 2015.

U.S. patent application Ser. No. 15/708,058 also claims the benefits and priority of, and is a continuation-in-part application of, International Patent Application No. PCT/US2016/038445, filed on Jun. 20, 2016, which claims the benefits and priority of U.S. Provisional Patent Application No. 62/181,718, filed on Jun. 18, 2015.

U.S. patent application Ser. No. 15/708,088 also claims the benefits and priority of, and is a continuation-in-part application of, International Patent Application No. PCT/CN2016/104354, filed on Nov. 2, 2016, which claims the benefits and priority of U.S. Provisional Patent Application No. 62/249,832, filed on Nov. 2, 2015.

The entire contents of the before-mentioned patent applications are incorporated by reference as part of the disclosure of this document.

TECHNICAL FIELD

This disclosure relates to optical sensors, such as an under-screen optical fingerprint sensors integrated with a display panel arrangement of mobile computing device and configured to provide a large sensing area.

BACKGROUND

Various sensors can be implemented in electronic devices or systems to provide certain desired functions. A sensor that enables user authentication is one example of sensors to protect personal data and prevent unauthorized access n various devices and systems including portable or mobile computing devices (e.g., laptops, tablets, smartphones), gaming systems, various databases, information systems or larger computer-controlled systems.

User authentication on an electronic device or system can be carried out through one or multiple forms of biometric identifiers, which can be used alone or in addition to conventional password authentication methods. A popular form of biometric identifiers is a person's fingerprint pattern. A fingerprint sensor can be built into the electronic device to read a user's fingerprint pattern so that the device can only be unlocked by an authorized user of the device through authentication of the authorized user's fingerprint pattern. Another example of sensors for electronic devices or systems is a biomedical sensor that detects a biological property of a user, e.g., a property of a user's blood, the heartbeat, in wearable devices like wrist band devices or watches. In general, different sensors can be provided in electronic devices to achieve different sensing operations and functions.

Fingerprints can be used to authenticate users for accessing electronic devices, computer-controlled systems, electronic databases or information systems, either used as a stand-alone authentication method or in combination with one or more other authentication methods such as a password authentication method. For example, electronic devices including portable or mobile computing devices, such as laptops, tablets, smartphones, and gaming systems can employ user authentication mechanisms to protect personal data and prevent unauthorized access. In another example, a computer or a computer-controlled device or system for an organization or enterprise should be secured to allow only authorized personnel to access in order to protect the information or the use of the device or system for the organization or enterprise. The information stored in portable devices and computer-controlled databases, devices or systems, may be personal in nature, such as personal contacts or phonebook, personal photos, personal health information or other personal information, or confidential information for proprietary use by an organization or enterprise, such as business financial information, employee data, trade secrets and oilier proprietary information. If the security of the access to the electronic device or system is compromised, these data may be accessed by others, causing loss of privacy of individuals or loss of valuable confidential information. Beyond security of information, securing access to computers and computer-controlled devices or systems also allow safeguard the use of devices or systems that are controlled by computers or computer processors such as computer-controlled automobiles and other systems such as ATMs.

Secured access to a device (e.g., a mobile device) or a system (e.g., an electronic database and a computer-controlled system) can be achieved in different ways such as the use of user passwords. A password, however, may be easily to be spread or obtained and this nature of passwords can reduce the level of the security of passwords. Moreover, since a user needs to remember a password in accessing password-protected electronic devices or systems, in the event that the user forgets the password, the user needs to undertake certain password recovery procedures to get authenticated or otherwise to regain the access to the device or system. Such processes may be burdensome to users and have various practical limitations and inconveniences. The personal fingerprint identification can be utilized to achieve the user authentication for enhancing the data security while mitigating certain undesired effects associated with passwords.

Electronic devices or systems, including portable or mobile computing devices, may employ user authentication through one or multiple forms of biometric identifiers to protect personal or other confidential data and prevent unauthorized access. A biometric identifier can be used alone or in combination with a password authentication method to provide user authentication. One form of biometric identifiers is a person's fingerprint pattern. A fingerprint sensor can be built into an electronic device or an information system to read a user's fingerprint pattern so that the device can only be unlocked by an authorized user of the device through authentication of the authorized user's fingerprint pattern.

SUMMARY

Embodiments provide optical sensing with a large sensing area in a thin package. For example, embodiments can operate in context of an under-display optical fingerprint sensor integrated into an electronic device, such as a smartphone. Responsive to reflected probe light passing through a display module, a reflective structure is configured to redirect the reflected probe light onto a refractive structure, and the refractive structure is configured to converge the reflected probe light into an input aperture of an optical sensor for detection. Some embodiments operate in context of an enhancement panel having micro-prism structures that tend to blur the reflected probe light. In such context, embodiments are configured for off-axis detection to prefer light passing through only certain micro-prism faces, thereby mitigating blurring.

BRIEF DESCRIPTION OF THE DRAWINGS

The accompanying drawings, referred to herein and constituting a part hereof, illustrate embodiments of the disclosure. The drawings together with the description serve to explain the principles of the invention.

Figure 1:
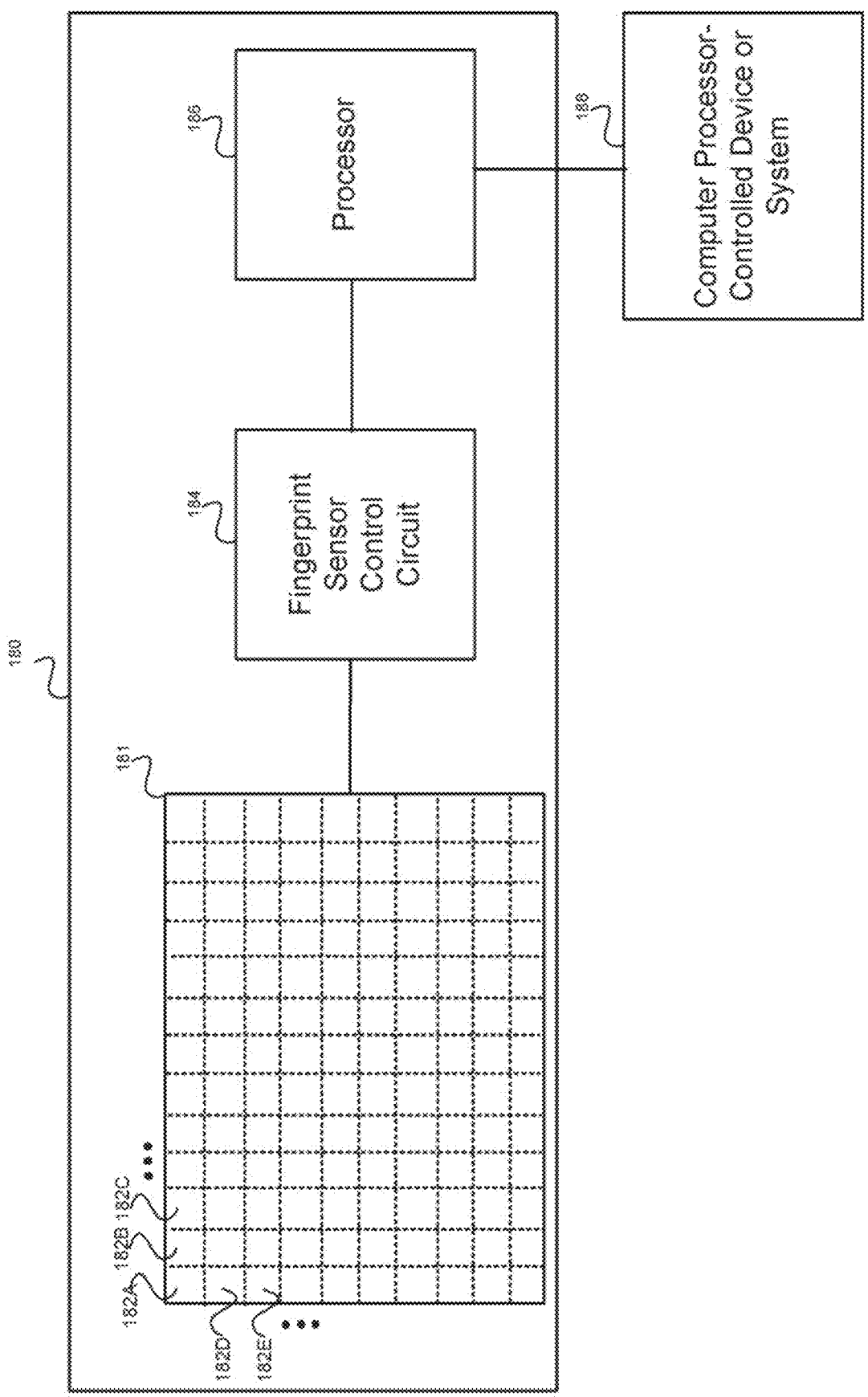
FIG. 1 is a block diagram of an example of a system with a fingerprint sensing module which can be implemented to include an optical fingerprint sensor according to some embodiments.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are provided for a thorough understanding of the present invention. However, it should be appreciated by those of skill in the art that the present invention may be realized without one or more of these details. In other examples, features and techniques known in the art will not be described for purposes of brevity.

Electronic devices or systems may be equipped with fingerprint authentication mechanisms to improve the security for accessing the devices. Such electronic devices or system may include, portable or mobile computing devices, e.g., smartphones, tablet computers, wrist-worn devices and other wearable or portable devices, larger electronic devices or systems, e.g., personal computers in portable forms or desktop forms, ATMs, various terminals to various electronic systems, databases, or information systems for commercial or governmental uses, motorized transportation systems including automobiles, boats, trains, aircraft and others.

Fingerprint sensing is useful in mobile applications and other applications that use or require secure access. For example, fingerprint sensing can be used to provide secure access to a mobile device and secure financial transactions including online purchases. It is desirable to include robust and reliable fingerprint sensing suitable for mobile devices and other applications. In mobile, portable or wearable devices, it is desirable for fingerprint sensors to minimize or eliminate the footprint for fingerprint sensing given the limited space on those devices, especially considering the demands for a maximum display area on a given device. Many implementations of capacitive fingerprint sensors must be implemented on lire top surface of a device due to the near-field interaction requirement of capacitive sensing.

Optical sensing modules can be designed to mitigate the above and other limitations in the capacitive fingerprint sensors and to achieve additional technical advantages. For example, in implementing an optical fingerprint sensing device, the light carrying fingerprint imagining information can be directed over distance to an optical detector array of optical detectors for detecting the fingerprint without being limited to the near-field sensing in a capacitive sensor. In particular, light carrying fingerprint imagining information can be directed to transmit through the top cover glass commonly used in many display screens such as touch sensing screens and other structures and may be directed through folded or complex optical paths to reach the optical detector array, thus allowing for flexibility in placing an optical fingerprint sensor in a device that is not available for a capacitive fingerprint sensor. Optical fingerprint sensor modules based on the technologies disclosure herein can be an under-screen optical fingerprint sensor module that is placed below a display screen to capture and detect light from a finger placed on or above the top sensing surface of the screen. As disclosed herein, optical sensing can also be used to, in addition to detecting and sensing a fingerprint pattern, optically detect other parameters associated with a user or a user action, such as whether a detected fingerprint is from a finger of a live person and to provide anti-spoofing mechanism, or certain biological parameters of the user.

I. Overview of Under-Display Optical Sensing Modules

The optical sensing technology and examples of implementations described in this disclosure provide an optical fingerprint sensor module that uses, at least in part, the light from a display screen as the illumination probe light to illuminate a fingerprint sensing area on the touch sensing surface of the display screen to perform one or more sensing operations based on optical sensing of such light. A suitable display screen for implementing the disclosed optical sensor technology can be based on various display technologies or configurations, including, a liquid crystal display (LCD) screen using a backlight to provide white light illumination to the LCD pixels and matched optical filters to effectuate colored LCD pixels, or a display screen having light emitting display pixels without using backlight where each individual pixel generates light for forming a display image on the screen such as an organic light emitting diode (OLED) display screens, or electroluminescent display screens. The specific examples provided below are directed to integration or under-screen optical sensing modules with LCD screens and thus contain certain technical details associated with LCD screens although various aspects of the disclosed technology are applicable to OLED screens and other display screens.

A portion of the light produced by a display screen for displaying images necessarily passes through the top surface of the display screen in order to be viewed by a user. A finger in touch with or near the top surface interacts with the light at the top surface to cause the reflected or scattered light at the surface area of the touch to carry spatial image information of the finger. Such reflected or scattered light carrying the spatial image information of the finger returns to the display panel underneath the top surface. In touch sensing display devices, for example, the top surface is the touch sensing interface with the user and this interaction between the light for displaying images and the user finger or hand constantly occurs but such information-carrying light returning back to the display panel is largely wasted and is not used in various touch sensing devices. In various mobile or portable devices with touch sensing displays and fingerprint sensing functions, a fingerprint sensor tends to be a separate device from the display screen, either placed on the same surface of the display screen at a location outside the display screen area such as in some models of Apple iPhones and Samsung smartphones, or placed on the backside of a smartphone, such as some models of smart phones by Huawei, Lenovo, Xiaomi or Google, to avoid taking up valuable space for placing a large display screen on the front side. Those fingerprint sensors are separate devices from the display screens and thus need to be compact to save space for the display screens and other functions while still providing reliable and fast fingerprint sensing with a spatial image resolution above a certain acceptable level. However, the need to be compact and small for designing a fingerprint sensor and the need to provide a high spatial image resolution in capturing a fingerprint pattern are in direct conflict with each other in many fingerprint sensors because a high spatial image resolution in capturing a fingerprint pattern in based on various suitable fingerprint sensing technologies (e.g., capacitive touch sensing or optical imaging) requires a large sensor area with a large number of sensing pixels.

The sensor technology and examples of implementations of the sensor technology described in this disclosure provide an optical fingerprint sensor module that uses, at least in part, the light front a display screen as the illumination probe light to illuminate a fingerprint sensing area on the touch sensing surface of the display screen to perform one or more sensing operations based on optical sensing of such light in some implementations, or designated illumination or probe light for optical sensing from one or more designated illumination light sources separate from the display light for optical sensing in other implementations, or background light for optical sensing in certain implementations.

In the disclosed examples for integrating an optical sensing module to a LCD screen based on the disclosed optical sensor technology, the under LCD optical sensor can be used to detect a portion of the light that is used for displaying images in a LCD screen where such a portion of the light for the display screen may be the scattered light, reflected light or some stray light. For example, in some implementations, the image light of the LCD screen based on backlighting may be reflected or scattered back into the LCD display screen as returned light when encountering an object such as a user linger or palm, or a user pointer device like a stylus. Such returned light can be captured for performing one or more optical sensing operations using the disclosed optical sensor technology. Due to the use of the light from LCD screen for optical sensing, an optical fingerprint sensor module based on the disclosed optical sensor technology is specially designed to be integrated to the LCD display screen in a way that maintains the display operations and functions of the LCD display screen without interference while providing optical sensing operations and functions to enhance overall functionality, device integration and user experience of an electronic device or system such as a smart phone, a tablet, or a mobile and/or wearable device.

In addition, in various implementations of the disclosed optical sensing technology, one or more designated probe light sources may be provided to produce additional illumination probe light for the optical sensing operations by the under-LCD screen optical sensing module. In such applications, the light from the backlighting of the LCD screen and the probe light from the one or more designated probe light sources collectively form the illumination light for optical sensing operations.

Regarding the additional optical sensing functions beyond fingerprint detection, the optical sensing may be used to measure other parameters. For example, the disclosed optical sensor technology can measure a pattern of a palm of a person given the large touch area available over the entire LCD display screen (in contrast, some designated fingerprint sensors such as the fingerprint senor in the home button of Apple's iPhone/iPad devices have a rather small and designated off-screen fingerprint sensing area that is highly limited in the sensing area size that may not be suitable for sensing large patterns). For yet another example, the disclosed optical sensor technology can be used not only to use optical sensing to capture and detect a pattern of a finger or palm that is associated with a person, but also to use optical sensing or other sensing mechanisms to detect whether the captured or detected pattern of a fingerprint or palm is from a live person's hand by a "live finger" detection mechanism, which may be based on, for example, the different optical absorption behaviors of the blood at different optical wavelengths, the fact that a live person's finger tends to be moving or stretching due to the person's natural movement or motion (either intended or unintended) or pulsing when the blood flows through the person's body in connection with the heartbeat. In one implementation, the optical fingerprint sensor module can detect a change in the returned light from a finger or palm due to the heartbeat/blood flow change and thus to detect whether there is a live heartbeat in the object presented as a finger or palm. The user authentication can be based on the combination of the both the optical sensing of the fingerprint/palm pattern and the positive determination of the presence of a live person to enhance the access control. For yet another example, the optical fingerprint sensor module may include a sensing function for measuring a glucose level or a degree of oxygen saturation based on optical sensing in the returned light from a finger or palm. As yet another example, as a person touches the LCD display screen, a change in the touching force can be reflected in one or more ways, including fingerprint pattern deforming, a change in the contacting area between the finger and the screen surface, fingerprint ridge widening, or a change in the blood flow dynamics. Those and other changes can be measured by optical sensing based on the disclosed optical sensor technology and can be used to calculate the touch force. This touch force sensing can be used to add more functions to the optical fingerprint sensor module beyond the fingerprint sensing.

With respect to useful operations or control features in connection with the touch sensing aspect of the LCD display screen, the disclosed optical sensor technology can provide triggering functions or additional functions based on one or more sensing results from the optical fingerprint sensor module to perform certain operations in connection with the touch sensing control over the LCD display screen. For example, the optical property of a finger skin (e.g., the index of refraction) tends to be different from other artificial objects. Based on this, the optical fingerprint sensor module may be designed to selectively receive and detect returned light that is caused by a finger in touch with the surface of the LCD display screen while returned light caused by other objects would not be detected by the optical fingerprint sensor module. This object-selective optical detection can be used to provide useful user controls by touch sensing, such as waking up the smartphone or device only by a touch via a person's finger or palm while touches by other objects would not cause the device to wake up for energy efficient operations and to prolong the battery use. This operation can be implemented by a control based on the output of the optical fingerprint sensor module to control the waking up circuitry operation of the LCD display screen which, the LCD pixels are put in a "sleep" mode by being turned off (and the LCD backlighting is also turned off) while one or more illumination light sources (e.g., LEDs) for the under-LCD panel optical fingerprint sensor module are turned on in a flash mode to intermittently emit flash light to the screen surface for sensing any touch by a person's finger or palm. Under this design, the optical fingerprint sensor module operates the one or more illumination light sources to produce the "sleep" mode wake-up sensing light flashes so that the optical fingerprint sensor module can detect returned light of such wake-up sensing light caused by the finger touch on the LCD display screen and, upon a positive detection, the LCD backlighting and the LCD display screen are turned on or "woken up". In some implementations, the wake-up sensing light can be in the infrared invisible spectral range so a user will not experience any visual of a flash light. The LCD display screen operation can be controlled to provide an improved fingerprint sensing by eliminating background light for optical sensing of the fingerprint. In one implementation, for example, each display scan frame generates a frame of fingerprint signals. If, two frames of fingerprint signals with the display are generated in one frame when the LCD display screen is turned on and in the other frame when the LCD display screen is turned off, the subtraction between those two frames of signals can be used to reduce the ambient background light influence. By operating the fingerprint sensing frame rate is at one half of the display frame rate in some implementations, the background light noise in fingerprint sensing can be reduced.

An optical fingerprint sensor module based on the disclosed optical sensor technology can be coupled to the backside of the LCD display screen without requiring creation of a designated area on the surface side of the LCD display screen that would occupy a valuable device surface real estate in some electronic devices such as a smartphone, a tablet or a wearable device. This aspect of the disclosed technology can be used to provide certain advantages or benefits in both device designs and product integration or manufacturing.

In some implementations, an optical fingerprint sensor module based on the disclosed optical sensor technology can be configured as a non-invasive module that can be easily integrated to a display screen without requiring changing the design of the LCD display screen for providing a desired optical sensing function such as fingerprint sensing. In this regard, an optical fingerprint sensor module based on the disclosed optical sensor technology can be independent from the design of a particular LCD display screen design due to the nature of the optical fingerprint sensor module the optical sensing of such an optical fingerprint sensor module is by detecting the light that is emitted by the one or more illumination light sources of the optical fingerprint sensor module and is returned from the top surface of the display area, and the disclosed optical fingerprint sensor module is coupled to the backside of the LCD display screen as a under-screen optical fingerprint sensor module for receiving the returned light from the top surface of the display area and thus does not require a special sensing port or sensing area that is separate from the display screen area. Accordingly, such an under-screen optical fingerprint sensor module can be used to combine with a LCD display screen to provide optical fingerprint sensing and other sensor functions on an LCD display screen without using a specially designed LCD display screen with hardware especially designed for providing such optical sensing. This aspect of the disclosed optical sensor technology enables a wide range of LCD display screens in smartphones, tablets or other electronic devices with enhanced functions from the optical sensing of the disclosed optical sensor technology.

For example, for an existing phone assembly design that does not provide a separate fingerprint sensor as in certain Apple iPhones or Samsung Galaxy smartphones, such an existing phone assembly design can integrate the under-screen optical fingerprint sensor module as disclosed herein without changing the touch sensing-display screen assembly to provide an added on-screen fingerprint sensing function Because the disclosed optical sensing does not require a separate designated sensing area or port as in the case of certain Apple iPhones/Samsung Galaxy phones with a front fingerprint senor outside the display screen area, or some smartphones with a designated rear fingerprint sensor on the backside like in some models by Huawei, Xiaomi, Google or Lenovo, the integration of the on-screen fingerprint sensing disclosed herein does not require a substantial change to the existing phone assembly design or the touch sensing display module that has both the touch sensing layers and the display layers. Based on the disclosed optical sensing technology in this document, no external sensing port and no external hardware button are needed on the exterior of a device are needed for adding the disclosed optical fingerprint sensor module for fingerprint sensing. The added optical fingerprint sensor module and the related circuitry are under the display screen inside the phone housing and the fingerprint sensing can be conveniently performed on the same touch sensing surface for the touch screen.

For another example, due to the above described nature of the optical fingerprint sensor module for fingerprint sensing, a smartphone that integrates such an optical fingerprint sensor module can be updated with improved designs, functions and integration mechanism without affecting or burdening the design or manufacturing of the LCD display screens to provide desired flexibility to device manufacturing and improvements/upgrades in product cycles while maintaining the availability of newer versions of optical sensing functions to smartphones, tablets or other electronic devices using LCD display screens. Specifically, the touch sensing layers or the LCD display layers may be updated in the next product release without adding any significant hardware change for the fingerprint sensing feature using the disclosed under-screen optical fingerprint sensor module. Also, improved on-screen optical sensing for fingerprint sensing or other optical sensing functions by such an optical fingerprint sensor module can be added to a new product release by using a new version of the under-screen optical fingerprint sensor module without requiring significant changes to the phone assembly designs, including adding additional optical sensing functions.

The above and other features of the disclosed optical sensor technology can be implemented to provide a new generation of electronic devices with improved fingerprint sensing and other sensing functions, especially for smartphones, tablets and other electronic devices with LCD display screens to provide various touch sensing operations and functions and to enhance the user experience in such devices. The features for optical fingerprint sensor modules disclosed herein may be applicable to various display panels based on different technologies including both LCD and OLED displays. The specific examples below are directed to LCD display panels and optical fingerprint sensor modules placed under LCD display panels.

In implementations of the disclosed technical features, additional sensing functions or sensing modules, such as a biomedical sensor, e.g., a heartbeat sensor in wearable devices like wrist band devices or watches, may be provided, in general, different sensors can be provided in electronic devices or systems to achieve different sensing operations and functions.

The disclosed technology can be implemented to provide devices, systems, and techniques that perform optical sensing of human fingerprints and authentication for authenticating an access attempt to a locked computer-controlled device such as a mobile device or a computer-controlled system, that is equipped with a fingerprint detection module. The disclosed technology can be used for securing access to various electronic devices and systems, including portable or mobile computing devices such as laptops, tablets, smartphones, and gaming devices, and other electronic devices or systems such as electronic databases, automobiles, bank ATMs, etc.

II. Design Examples of Under-Display Optical Sensing Modules

As described herein, embodiments provide large-sensing-area implementations of under-display optical sensing modules, such as for under-screen optical fingerprint modules. For the sake of added clarity and context, examples are described of various designs for an under-screen optical fingerprint sensor module for collecting an optical signal to the optical detectors and providing desired optical imaging such as a sufficient imaging resolution. These and other embodiments of under-display optical fingerprint sensing implementations are further described in the following patent documents, which are hereby incorporated by reference in their entirety. U.S. patent application Ser. No. 15/616,856; U.S. patent application Ser. No. 15/421,249, U.S. patent application Ser. No. 16/190,138; U.S. patent application Ser. No. 16/190,141; U.S. patent application Ser. No. 16/246, 549; and U.S. patent application Ser. No. 16/427,269.

FIG. 1 is a block diagram of an example of a system 180 with a fingerprint sensing module 180 including a fingerprint sensor 181 which can be implemented to include an optical fingerprint sensor based on the optical sensing of fingerprints as disclosed in this document. The system 180 includes a fingerprint sensor control circuit 184, and a digital processor 186 which may include one or more processors for processing fingerprint patterns and determining whether an input fingerprint pattern is one for an authorized user. The fingerprint sensing system 180 uses the fingerprint sensor 181 to obtain a fingerprint and compares the obtained fingerprint to a stored fingerprint to enable or disable functionality in a device or system 188 that is secured by the fingerprint sensing system 180. In operation, the access to the device 188 is controlled by the fingerprint processing processor 186 based on whether the captured user fingerprint is from an authorized user. As illustrated, the fingerprint sensor 181 may include multiple fingerprint sensing pixels such as pixels 182A 182E that collectively represent at least a portion of a fingerprint. For example, the fingerprint sensing system 180 may be implemented at an ATM as the system 188 to determine the fingerprint of a customer requesting to access funds or other transactions. Based on a comparison of the customer's fingerprint obtained from the fingerprint sensor 181 to one or more stored fingerprints, the fingerprint sensing system 180 may, upon a positive identification, cause the ATM system 188 to gram the requested access to the user account, or, upon a negative identification, may deny the access. For another example, the device or system 188 may be a smartphone or s portable device and the fingerprint sensing system 180 is a module integrated to the device 188. For another example, the device or system 188 may be a gate or secured entrance to a facility or home that uses the fingerprint sensor 181 to grant or deny entrance. For yet another example, the device or system 188 may be an automobile or other vehicle that uses the fingerprint sensor 181 to link to the start of the engine and to identify whether a person is authorized to operate the automobile or vehicle.

Figure 2A:
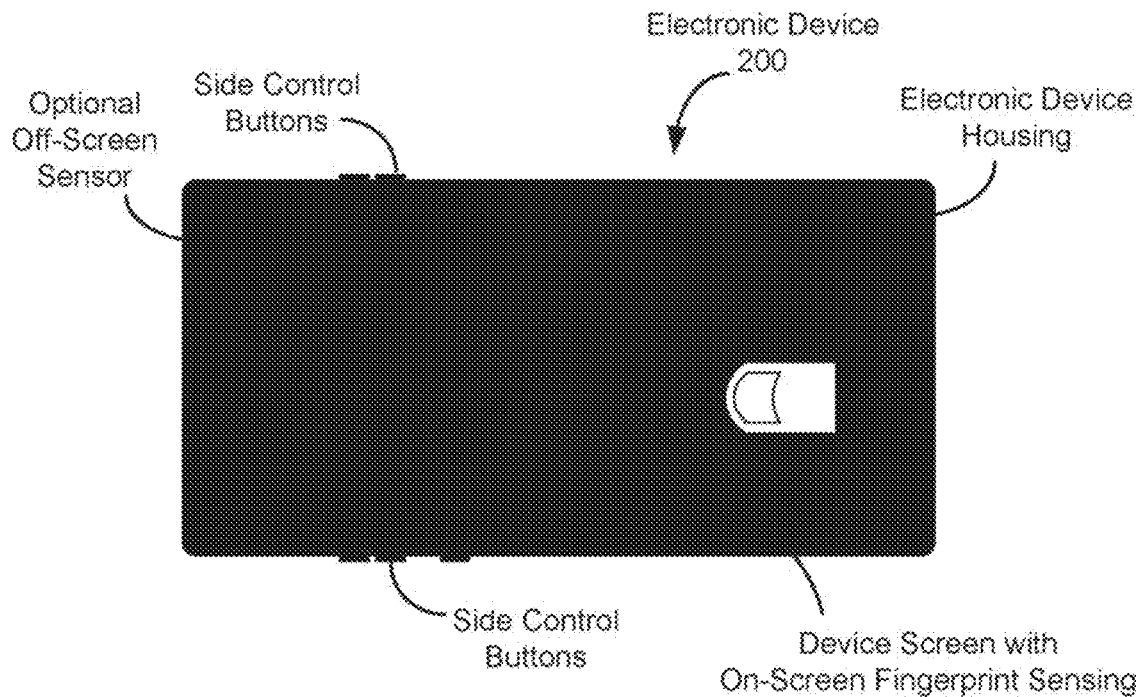
FIGS. 2A and 2B illustrate an exemplary implementation of an electronic device having a touch sensing display screen assembly and an optical fingerprint sensor module positioned underneath the touch sensing display screen assembly according to some embodiments.
Figure 2B:
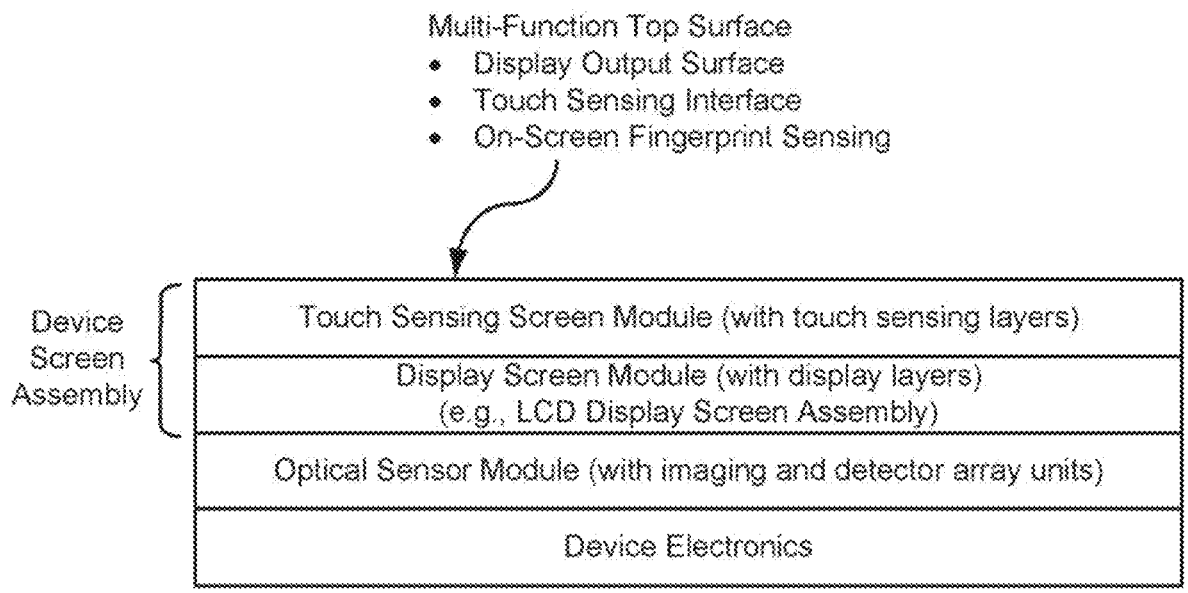

As a specific example, FIGS. 2A and 2B illustrate one exemplary implementation of an electronic device 200 having a touch sensing display screen assembly and an optical fingerprint sensor module positioned underneath the touch sensing display screen assembly. In this particular example, the display technology can be implemented by a LCD display screen with backlight for optically illuminating the LCD pixels or another display screen having light emitting display pixels without using backlight (e.g., an OLED display screen). The electronic device 200 can be a portable device such as a smartphone or a tablet and can be the device 188 as shown in FIG. 1.

FIG. 2A shows the front side of the device 200 which may resemble some features in some existing smartphones or tablets. The device screen is on the front side of the device 200 occupying either entirely, a majority or a significant portion of the front side space and the fingerprint sensing function is provided on the device screen, e.g., one or more sensing areas for receiving a finger on the device screen. As an example, FIG. 2A shows a fingerprint sensing zone in the device screen for a finger to touch which may be illuminated as a visibly identifiable zone or area for a user to place a finger for fingerprint sensing. Such a fingerprint sensing zone can function like the rest of the device screen for displaying images. As illustrated, the device housing of the device 200 may have, in various implementations, side facets that support side control buttons that are common in various smartphones on the market today. Also, one or more optional sensors may be provided on the front side of the device 200 outside the device screen as illustrated by one example on the left upper corner of the device housing in FIG. 2A.

FIG. 2B shows an example of the structural construction of the modules in the device 200 relevant to the optical fingerprint sensing disclosed in this document. The device screen assembly shown in FIG. 2B includes, e.g., the touch sensing screen module with touch sensing layers on the top, and a display screen module with display layers located underneath the touch sensing screen module. An optical fingerprint sensor module is coupled to, and located underneath, the display screen assembly module to receive and capture the returned light from the top surface of the touch sensing screen module and to guide and image the returned light onto an optical sensor array of optical sensing pixels or photodetectors which convert the optical image in the returned light into pixel signals for further processing. Underneath the optical fingerprint sensor module is the device electronics structure containing certain electronic circuits for the optical fingerprint sensor module and other parts in the device 200. The device electronics may be arranged inside the device housing and may include a part that is under the optical fingerprint sensor module as shown in FIG. 2B.

In implementations, the top surface of the device screen assembly can be a surface of an optically transparent layer serving as a user touch sensing surface to provide multiple functions, such as (1) a display output surface through which the light carrying the display images passes through to reach a viewer's eyes. (2) a touch sensing interface to receive a user's touches for the touch sensing operations by the touch sensing screen module, and (3) an optical interface for on-screen fingerprint sensing (and possibly one or more other optical sensing functions). This optically transparent layer can be a rigid layer such as a glass or crystal layer or a flexible layer.

One example of a display screen is an LCD display having LCD layers and a thin film transistor (TFT) structure or substrate. A LCD display panel is a multi-layer liquid crystal display (LCD) module that includes LCD display backlighting light sources (e.g., LED lights) emitting LCD illumination light for LCD pixels, a light waveguide layer to guide the backlighting light, and LCD structure layers which can include, e.g., a layer of liquid crystal (LC) cells, LCD electrodes, transparent conductive ITO layer, an optical polarizer layer, a color filter layer, and a touch sensing layer. The LCD module also includes a backlighting diffuser underneath the LCD structure layers and above the light waveguide layer to spatially spread the backlighting light for illuminating the LCD display pixels, and an optical reflector film layer underneath the light waveguide layer to recycle backlighting light towards the LCD structure layers for improved light use efficiency and the display brightness. For optical sensing, one or more separate illumination light sources are provided and are operated independently from the backlighting light sources of the LCD display module.

Referring to FIG. 2B, the optical fingerprint sensor module in this example is placed under the LCD display panel to capture the retuned light from the top touch sensing surface and to acquire high resolution images of fingerprint patterns when user's ringer is in touch with a sensing area on the top surface. In other implementations, the disclosed under-screen optical fingerprint sensor module for fingerprint sensing may be implemented on a device without the touch sensing feature.

Figure 3A:
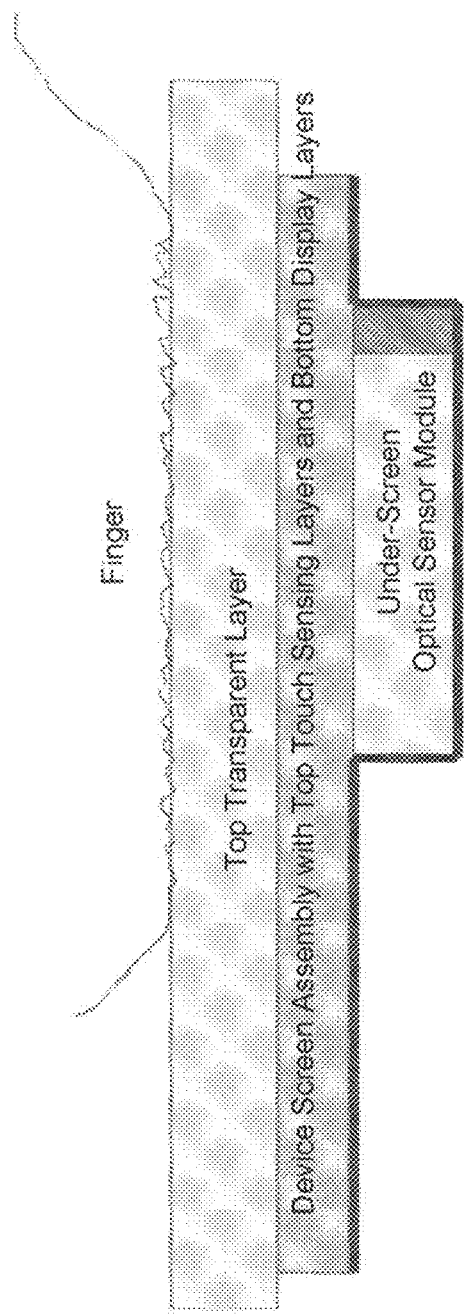
FIGS. 3A and 3B illustrate an example of a device that implements the optical fingerprint sensor module illustrated in FIGS. 2A and 2B according to some embodiments.
Figure 3B:
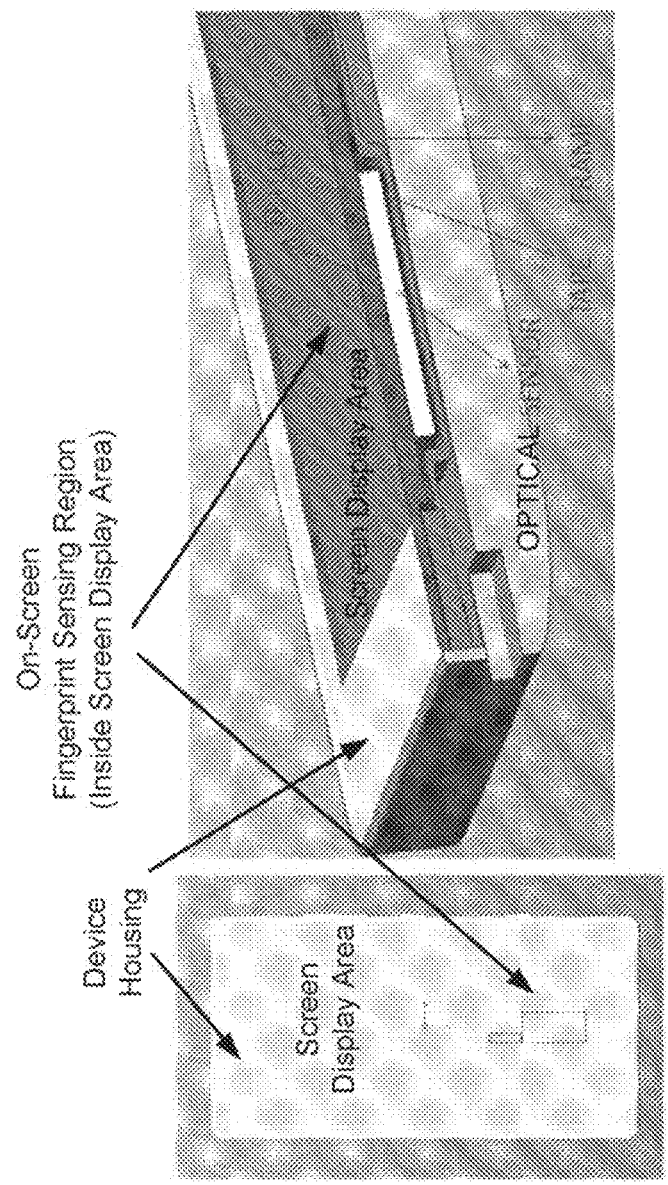

FIGS. 3A and 3B illustrate an example of a device that implements the optical fingerprint sensor module in FIGS. 2A and 2B. FIG. 3A shows a cross sectional view of a portion of the device containing the under-screen optical fingerprint sensor module. FIG. 3B shows, on the left, a view of the front side of the device with the touch sensing display indicating a fingerprint sensing area on the lower part of the display screen, and on the right, a perspective view of a part of the device containing the optical fingerprint sensor module that is under the device display screen assembly. FIG. 3B also shows an example of the layout of the flexible tape with circuit elements.

In the design examples in FIGS. 2A-2B, and 3A-3B, the optical fingerprint sensor design is different from some other fingerprint sensor designs using a separate fingerprint sensor structure from the display screen with a physical demarcation between the display screen and the fingerprint sensor (e.g., a button like structure in an opening of the top glass cover in some mobile phone designs) on the surface of the mobile device. In the illustrated designs here, the optical fingerprint sensor for detecting fingerprint sensing and other optical signals are located under the top cover glass or layer (e.g., FIG. 3A) so that the top surface of the cover glass serves as the top surface of the mobile device as a contiguous and uniform glass surface across both the display screen layers and the optical detector sensor that are vertically stacked and vertically overlap. This design example for integrating optical fingerprint sensing and the touch sensitive display screen under a common and uniform surface provides benefits, including improved device integration, enhanced device packaging, enhanced device resistance to exterior elements, failure and wear and tear, and enhanced user experience over the ownership period of the device.

Referring back to FIGS. 2A and 2B, the illustrated under-screen optical fingerprint sensor module for on-screen fingerprint sensing may be implemented in various configurations. In one implementation, a device based on the above design can be structured to include a device screen a that provides touch sensing operations and includes a LCD display panel structure for forming a display image, a top transparent layer formed over the device screen as an interface for being touched by a user for the touch sensing operations and for transmitting the light from the display structure to display images to a user, and an optical fingerprint sensor module located below the display panel structure to receive light that returns from the top transparent layer to detect a fingerprint.

This device and other devices disclosed herein can be further configured to include various features. For example, a device electronic control module can be included in the device to grant a user's access to the device if a detected fingerprint matches a fingerprint an authorized user. In addition, the optical fingerprint sensor module is configured to, in addition to detecting fingerprints, also detect a biometric parameter different form a fingerprint by optical sensing to indicate whether a touch at the top transparent layer associated with a detected fingerprint is from a live person, and the device electronic central module is configured to grant a user's access to the device if both (1) a detected fingerprint matches a fingerprint an authorized user and (2) the detected biometric parameter indicates the detected fingerprint is from a live person. The biometric parameter can include, e.g., whether the finger contains a blood flow, or a heartbeat of a person.

For example, the device can include a device electronic control module coupled to the display panel structure to supply power to the light emitting display pixels and to control image display by the display panel structure, and, in a fingerprint sensing operation, the device electronic control module operates to turn off the light emitting display pixels in one frame to and turn on the light emitting display pixels in a next frame to allow the optical sensor array to capture two fingerprint images with and without the illumination by the light emitting display pixels to reduce background light in fingerprint sensing.

For another example, a device electronic control module may be coupled to the display panel structure to supply power to the LCD display panel and to turn off power to the backlighting of the LCD display panel in a sleep mode, and the device electronic control module may be configured to wake up the display panel structure from the sleep mode when the optical fingerprint sensor module detects the presence of a person's skin at the designated fingerprint sensing region of the top transparent layer. More specifically, in some implementations, the device electronic control module can be configured to operate one or more illumination light sources in the optical fingerprint sensor module to intermittently emit light, while turning off power to the LCD display panel (in the sleep mode), to direct the intermittently emitted illumination light to the designated fingerprint sensing region of the top transparent layer for monitoring whether there is a person's skin in contact with the designated fingerprint sensing region for waking up the device from the sleep mode.

For another example, the device can include a device electronic control module coupled to the optical fingerprint sensor module to receive information on multiple detected fingerprints obtained from sensing a touch of a finger and the device electronic control module is operated to measure a change in the multiple detected fingerprints and determines a touch force that causes the measured change. For instance, the change may include a change in the fingerprint image due to the touch force, a change in the touch area due to the touch force, or a change in spacing of fingerprint ridges.

For another example, the top transparent layer can include a designated fingerprint sensing region for a user to touch with a finger for fingerprint sensing and the optical fingerprint sensor module below the display panel structure can include a transparent block in contact with the display panel substrate to receive light that is emitted from the display panel structure and returned from the top transparent layer, an optical sensor array that receives the light and an optical imaging module that images the received light in the transparent block onto the optical sensor array. The optical fingerprint sensor module can be positioned relative to the designated fingerprint sensing region and structured to selectively receive returned light via total internal reflection at the top surface of the top transparent layer when in contact with a person's skin while not receiving the returned light from the designated fingerprint sensing region in absence of a contact by a person's skin.

For yet another example, the optical fingerprint sensor module can be structured to include an optical wedge located below the display panel structure to modify a total reflection condition on a bottom surface of the display panel structure that interfaces with the optical wedge to permit extraction of light out of the display panel structure through the bottom surface, an optical sensor array that receives the light from the optical wedge extracted from the display panel structure, and an optical imaging module located between the optical wedge and the optical sensor array to image the light from the optical wedge onto the optical sensor array.

Figure 4A:
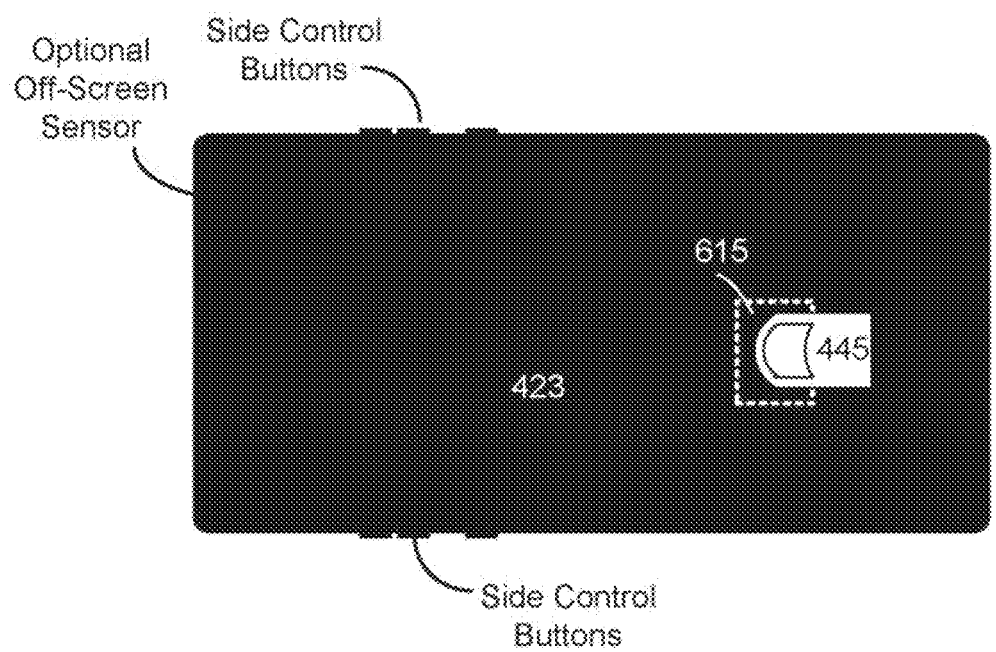
FIGS. 4A and 4B show an exemplary implementation of an optical fingerprint sensor module under the display screen assembly for implementing the design illustrated in FIGS. 2A and 2B according to some embodiments.
Figure 4B:
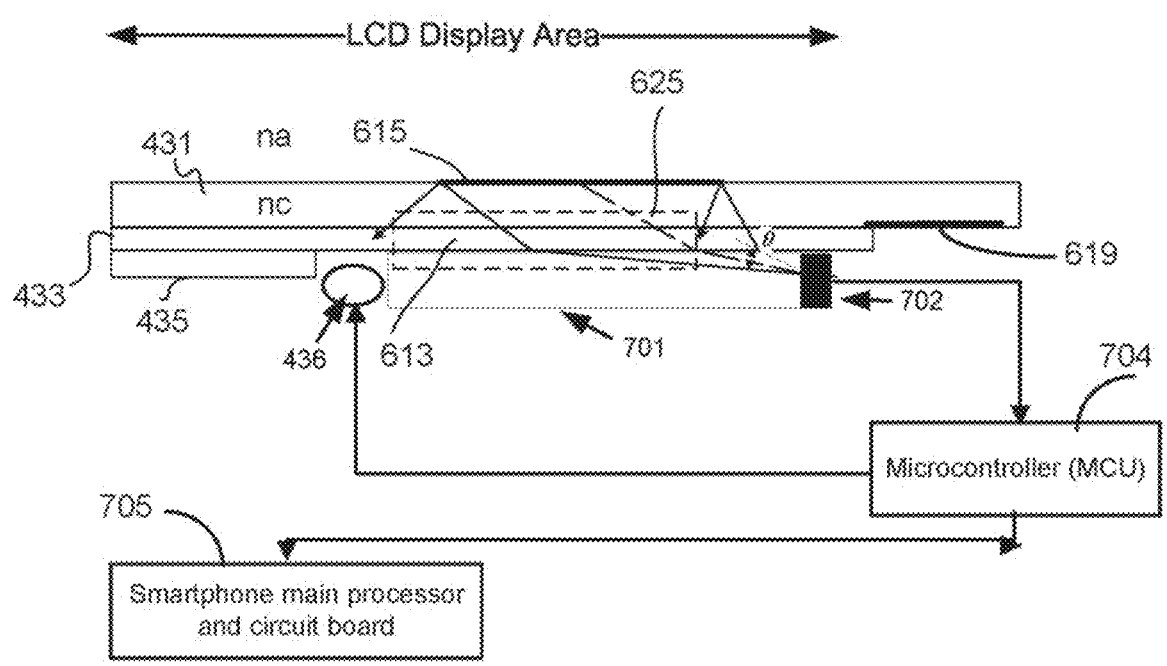

FIGS. 4A and 4B show an example of one implementation of an optical fingerprint sensor module under the display screen assembly for implementing the design in FIGS. 2A and 2B. The device illustrated in FIGS. 4A and 4B includes a display assembly 423 with a top transparent layer 431 formed over the device screen assembly 423 as an interface for being touched by a user for the touch sensing operations and for transmitting the light from the display structure to display images to a user. This top transparent layer 431 can be a cover glass or a crystal material in some implementations. The device screen assembly 423 can include a LCD display module 433 under the top transparent layer 431. The LCD display layers allow partial optical transmission so light from the top surface can partially transmit through the LCD display layers to reach the under-LCD optical fingerprint sensor module. For example, LCD display layers include electrodes and wiring structure optically acting as an array of holes and tight scattering objects. A device circuit module 435 may be provided under the LCD display panel to control operations of the device and perform functions for the user to operate the device.

The optical fingerprint sensor module 702 in this particular implementation example is placed under LCD display module 433. One or more illumination light sources, e.g., an illumination light source 436 under the LCD display module 433 or/and another one or more illumination light sources located under the top cover glass 431, are provided for providing the illumination light or probe light for the optical sensing by the optical fingerprint sensor module 702 and can be controlled to emit light to at least partially pass through the LCD display module 433 to illuminate the fingerprint sensing zone 615 on the top transparent layer 431 within the device screen area for a user to place a finger therein for fingerprint identification. The illumination light from the one or more illumination light sources 436 can be directed to the fingerprint sensing area 615 on the top surface as if such illumination light is from a fingerprint illumination light zone 613. Another one or more illumination light sources may be located under the top cover glass 431 and may be placed adjacent to the fingerprint sensing area 615 on the top surface to direct produced illumination light to reach the top cover glass 433 without passing through the LCD display module 433. In some designs, one or more illumination light sources may be located above the bottom surface of the lop cover glass 431 to direct produced illumination light to reach the fingerprint sensing region above the top surface of the top cover glass 433 without necessarily passing through the top cover glass 431, e.g., directing illuminating the finger above the top cover glass 431.

As illustrated in FIG. 4A, a finger 445 is placed in the illuminated fingerprint sensing zone 615 as the effective sensing zone for fingerprint sensing. A portion of the reflected or scattered light in the zone 615 is directed into the optical fingerprint sensor module underneath the LCD display module 433 and a photodetector sensing array inside the optical fingerprint sensor module receives such light and captures the fingerprint pattern information carried by the received light. The one or more illumination light sources 436 are separate from the backlighting sources for the LCD display module and are operated independently from the backlighting light sources of the LCD display module.

In this design of using one or more illumination light sources 436 to provide the illumination light for optical fingerprint sensing, each illumination light source 436 maybe controlled in some implementations to turn on intermittently with a relatively low cycle to reduce the power used for the optical sensing operations. The fingerprint sensing operation can be implemented in a two-step process in some implementations first, the one or more illumination light sources 436 are turned on in a flashing mode without turning on the LCD display panel to use the flashing light to sense whether a finger touches the sensing zone 615 and, once a touch in the zone 615 is detected, the optical sensing module is operated to perform the fingerprint sensing based on optical sensing and the LCD display panel may be turned on.

In the example in FIG. 4B, the under-screen optical fingerprint sensor module includes a transparent block 701 that is coupled to the display panel to receive the returned light from the top surface of the device assembly, and an optical imaging block 702 that performs the optical imaging and imaging capturing. Light from the one or more illumination light sources 436, after reaching the cover top surface, e.g., the cover top surface at the sensing area 615 where a user finger touches or is located without touching the cover top surface, is reflected or scattered back from the cover top surface in a design in which the illumination light source 436 is located to direct the illumination light to first transmit through the top cover glass 431 to reach the finger. When fingerprint ridges in contact of the cover top surface in the sensing area 615, the light reflection under the fingerprint ridges is different, due to the presence of the skin or tissue of the finger in contact at that location, from the light reflection at another location under the fingerprint valley, where the skin or tissue of the finger is absent. This difference in light reflection conditions at the locations of the ridges and valleys in the touched finger area on the cover lop surface forms an image representing an image or spatial distribution of the ridges and valleys of the touched section of the finger. The reflection light is directed back towards the LCD display module 433, and, after passing through the small holes of the LCD display module 433, reaches the interface with the low index optically transparent block 701 of the optical fingerprint sensor module. The low index optically transparent block 701 is constructed to have a refractive index less than a refractive index of the LCD display panel so that the returned light can be extracted out of the LCD display panel into the optically transparent block 701. Once the returned light is received inside the optically transparent block 701, such received light enters the optical imaging unit as pail of the imaging sensing block 702 and is imaged onto the photodetector sensing array or optical sensing array inside the block 702. The light reflection differences between fingerprint ridges and valleys create the contrast of the fingerprint image. As shown in FIG. 4B, a control circuit 704 (e.g. a microcontroller or MCU) is coupled to the imaging sensing block 702 and to other circuitry such as the device main processor 705 on a main circuit board.

In this particular example, the optical light path design is structured so that the illumination light enters the cover top surface within the total reflection angles on the top surface between the substrate and air interface and, therefore, the reflected light is collected most effectively by the imaging optics and imaging sensor array in the block 702. In this design, the image of the fingerprint ridge/valley area exhibits a maximum contrast due to the total internal reflection condition at each finger valley location where the finger tissue does not touch the top cover surface of the top cover glass 431. Some implementations of such an imaging system may have undesired optical distortions that would adversely affect the fingerprint sensing. Accordingly, the acquired image may be further corrected by a distortion correction during the imaging reconstruction in processing the output signals of the optical sensor array in the block 702 based on the optical distortion profile along the light paths of the returned light at the optical sensor array. The distortion correction coefficients can be generated by images captured at each photodetector pixel by scanning a test image pattern one line pixel at a time, through the whole sensing area in both X direction lines and Y direction lines. This correction process can also use images from tuning each individual pixel on one at a time, and scanning through the whole image area of the photodetector array. This correction coefficients only need to be generated one time after assembly of the sensor.

The background light from environment (e.g., sunlight or room illumination light) may enter the image sensor through the LCD panel top surface, and through holes in the LCD display assembly 433. Such background light can create a background baseline in the interested images from a finger and thus may undesirably degrade the contrast of a captured image. Different methods can be used to reduce this undesired baseline intensity caused by the background light. One example is to tune on and off the illumination light source 436 at a certain illumination modulation frequency f and the image sensor accordingly acquires the received images at the same illumination modulation frequency by phase synchronizing the light source driving pulse and image sensor frame. Under this operation, only one of the image phases contain light from the tight source. In implementing this technique, the imaging capturing can be timed to capture images with the illumination light on at even (or odd) frames while turning oil the illumination light at odd (or even) frames and, accordingly, subtracting even and odd frames can be used to obtain an image which is mostly formed by light emitted from the modulated illumination light source with significantly reduced background light. Based on this design, each display scan frame generates a frame of fingerprint signals and two sequential frames of signals are obtained by turning on the illumination light in one frame and off in the other frame. The subtraction of adjacent frames can be used to minimize or substantially reduce the ambient background light influence. In implementations, the fingerprint sensing frame rate can be one half of the display frame rate.

In the example shown in FIG. 4B, a portion of the light from the one or more illumination light sources 436 may also go through the cover top surface and enter the finger tissues. This part of the illumination light is scattered around and a part of this scattered light may be eventually collected by the imaging sensor array in the optical fingerprint sensor module 702. The light intensity of this scattered light b a result of interacting with the inner tissues of the finger and thus depends on the finger's skin color, the blood concentration in the finger tissue or the inner finger tissues. Such information of the finger is carried by this scattered light on the finger, is useful for fingerprint sensing, and can be detected as part of the fingerprint sensing operation. For example, the intensity of a region of users finger image can be integrated in detection for measuring or observing in increase or decrease in the blood concentration that is associated with or depends on the phase of the user's heart-beat. This signature can be used to determine the user's heart beat rate, to determine if the user's finger is a live finger, or to provide a spoof device with a fabricated fingerprint pattern. Additional examples of using information in light carrying information on the inner tissues of a finger are provided in later sections of this patent document.

The one or more illumination light sources 436 in FIG. 4B can be designed to emit illumination light of different colors or wavelengths in some designs and the optical fingerprint sensor module can capture returned light from a person's finger at the different colors or wavelengths. By recording the corresponding measured intensity of the returned light at the different colors or wavelengths, information associated with the user's skin color, the blood flow or inner tissue structures inside the finger can be measured or determined. As an example, when a user registers a finger for fingerprint authentication operation, the optical fingerprint sensor can be operated to measure the intensity of the scatter light from the finger at two different colors or illumination light wavelengths associated with light color A and light color B, as intensities Ia and Ib, respectively. The ratio of Ia/Ib could be recorded to compare with later measurement when the user's finger is placed on the sensing area on the top sensing surface to measure the fingerprint. This method can be used as part of the device's anti spoofing system to reject a spoof device that is fabricated with a fingerprint emulating or being identical to a user's fingerprint but may not match user's skin color or other biological information of the user.

The one or more illumination light sources 436 can be controlled by the same electronics 704 (e.g., MCU) for controlling the image sensor array in the block 702. The one or more illumination light sources 436 can be pulsed for a short time (e.g., at a low duty cycle) to emit light intermittently and to provide pulse light for image sensing. The image sensor array can be operated to monitor the light pattern at the same pulse duty cycle. If there is a human finger touching the sensing area 615 on the screen, the image that is captured at the imaging sensing array in the block 702 can be used to detect the touching event. The control electronics or MCU 704 connected to the image sensor army in the block 702 can be operated to determine if the touch is by a human finger touch. If it is confirmed that it is a human finger touch event, the MCU 704 can be operated to wake up the smartphone system, turn on the one or more illumination light sources 436 for performing the optical fingerprint sensing), and use the normal mode to acquire a full fingerprint image. The image sensor array in the block 702 sends the acquired fingerprint image to the smartphone main processor 705 which can be operated to match the captured fingerprint image to the registered fingerprint database. If there is a match, the smartphone unlocks the phone to allow a user to access the phone and start the normal operation, if the captured image is not matched, the smartphone produces a feedback to user that the authentication is failed and maintains the locking status of the phone. The user may try to go through the fingerprint sensing again, or may input a passcode as an alternative way to unlock the phone.

In the example illustrated in FIGS. 4A and 4B, the under-screen optical fingerprint sensor module uses the optically transparent block 701 and the imaging sensing block 702 with the photodetector sensing array to optically image the fingerprint pattern of a touching finger in contact with the top surface of the display screen onto the photodetector sensing array. The optical imaging axis or detection axis 625 from the sensing zone 615 to the photodetector array in the block 702 is illustrated in FIG. 4B for the illustrated example. The optically transparent block 701 and the front end of the imaging sensing block 702 before the photodetector sensing array forma a bulk imaging module to achieve proper imaging for the optical fingerprint sensing Due to the optical distortions in this imaging process, a distortion correction can be used to achieve the desired imaging operation.

In the optical sensing by the under-screen optical fingerprint sensor module in FIGS. 4A and 4B and other designs disclosed herein, the optical signal from the sensing zone 615 on the top transparent layer 431 to the under-screen optical fingerprint sensor module include different light components.

Figure 5A:
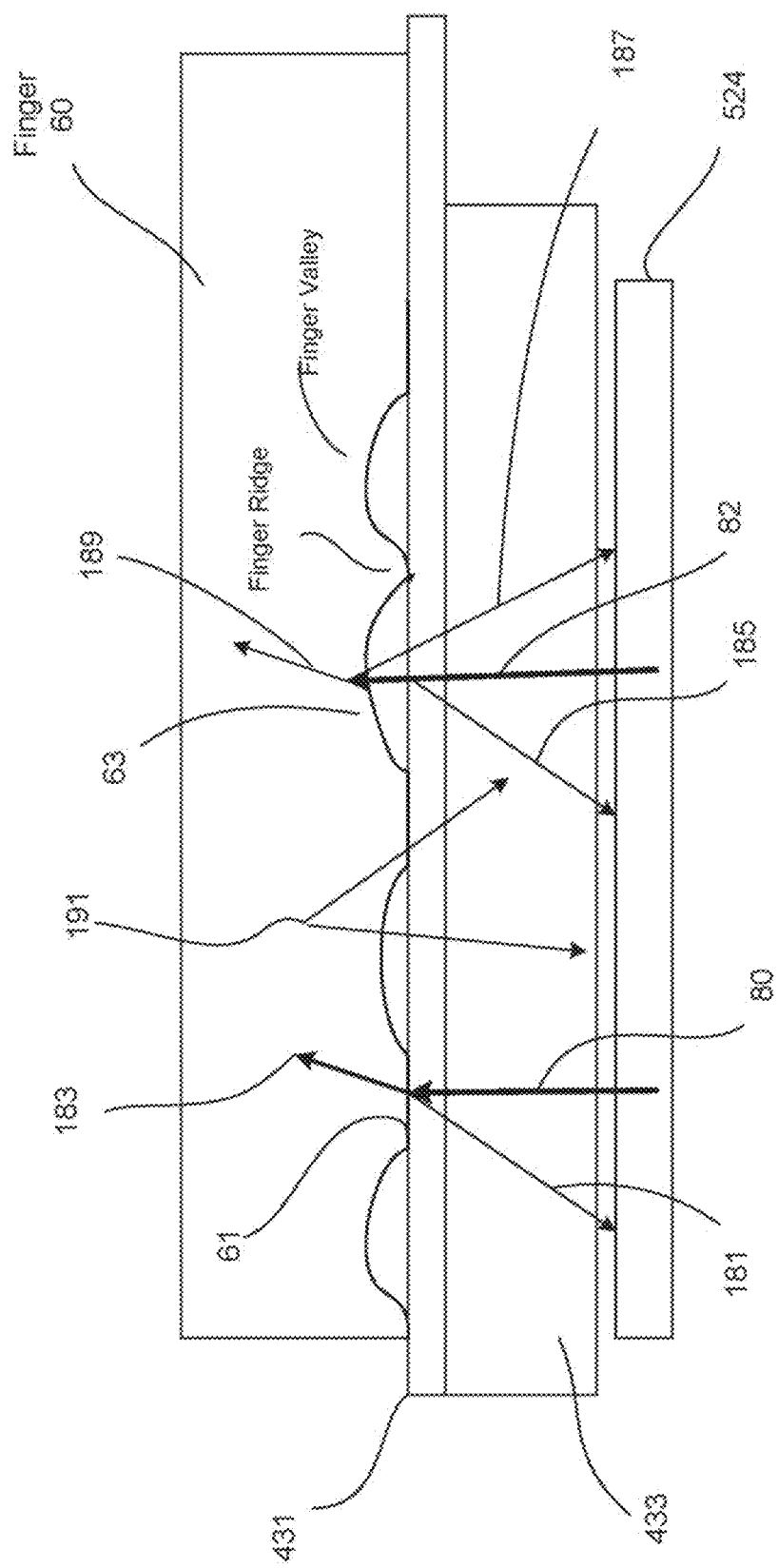
FIGS. 5A-5C illustrate signal generation tor the returned light from the sensing zone on the top sensing surface under two different optical conditions to facilitate the understanding of the operation of an under-screen optical fingerprint sensor module according to some embodiments.
Figure 5B:
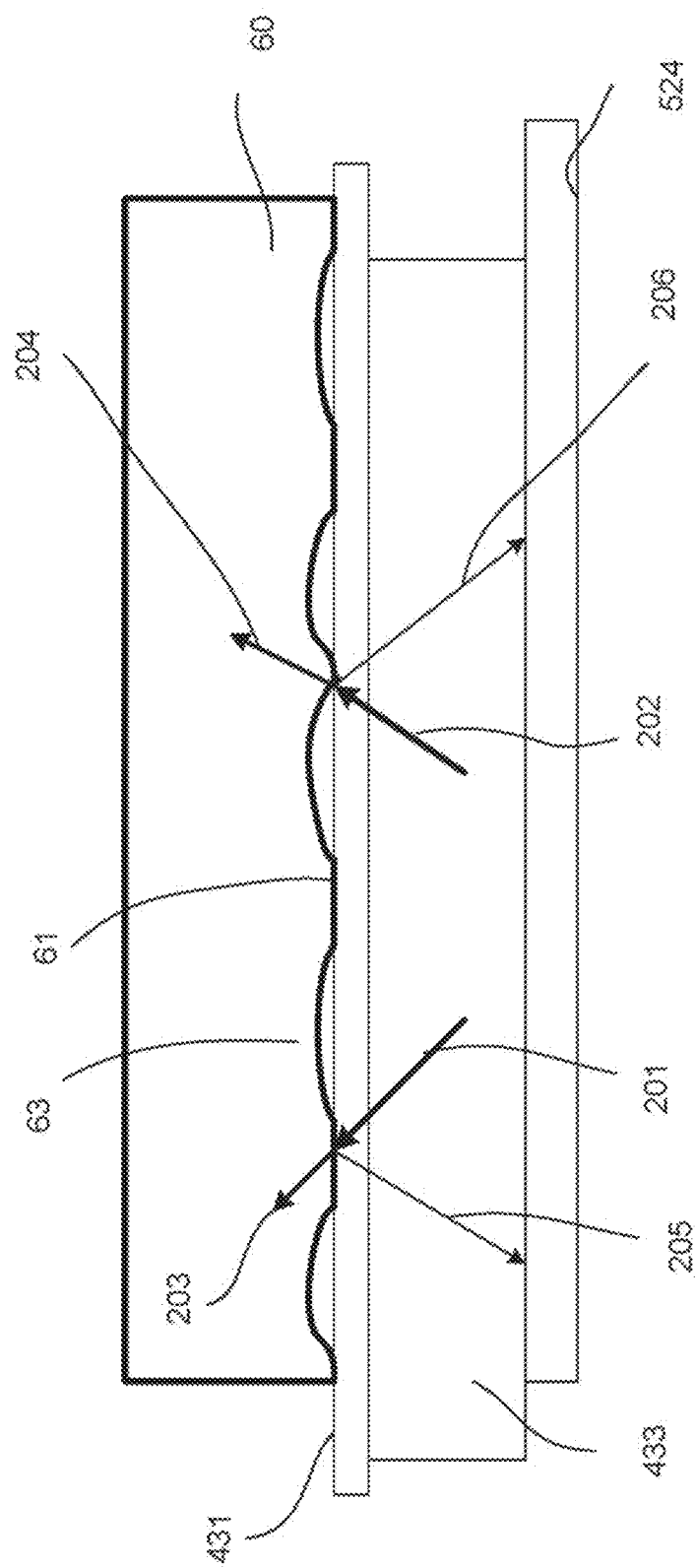
Figure 5C:
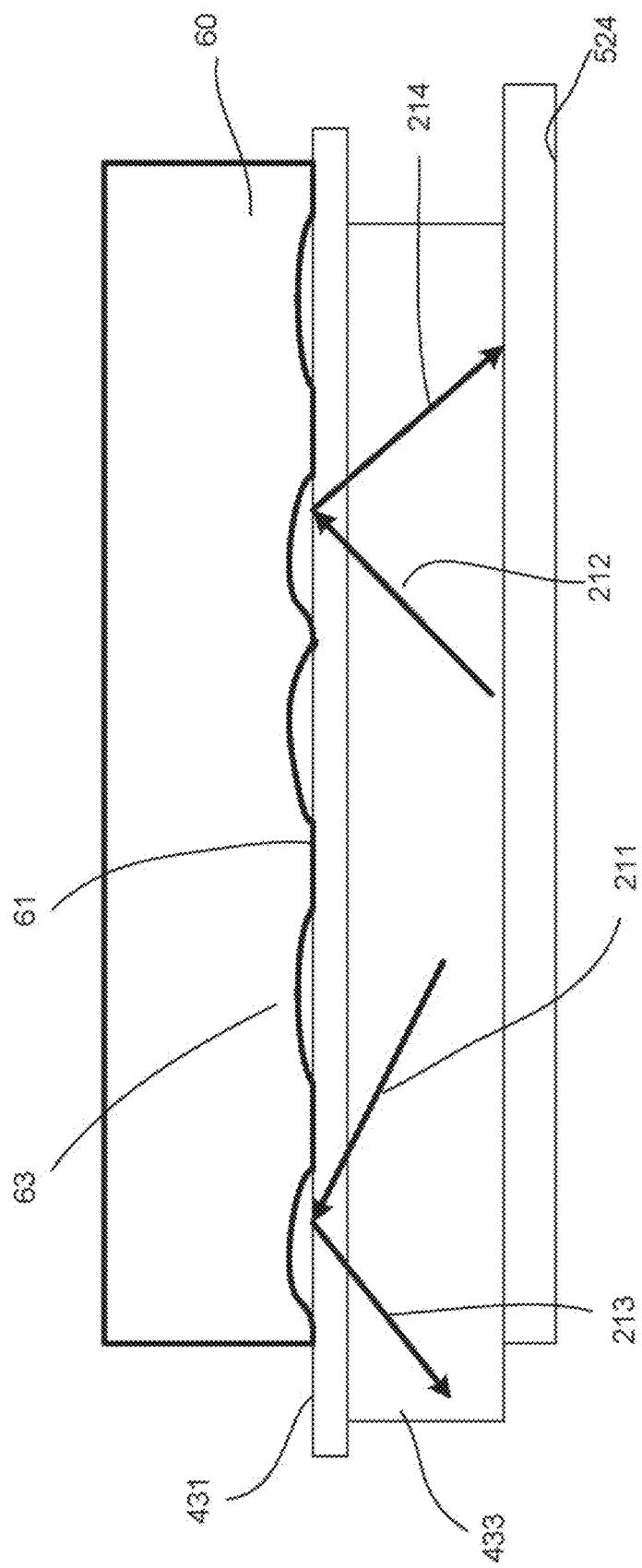

FIGS. 5A-5C illustrate signal generation for the returned light from the sensing zone 615 under different optical conditions to facilitate the understanding of the operation of the under-screen optical fingerprint sensor module. The light that enters into the finger, either from the illumination light source or from other light sources (e.g., background light) can generate internally scattered light in tissues below the finger surface, such as the scattered light 191 in FIGS. 5A-5C. Such internally scattered light in tissues below the finger surface can propagate through the internal tissues of the finger and subsequently transmits through the finger skin to enter the (op transparent layer 431 carrying certain information is not carried by light that is scattered, refracted or reflected by the finger surface, e.g., information on finger skin color, the blood concentration or flow characteristics inside the finger, or an optical transmissive pattern of the finger that contains both (1) a two-dimensional spatial pattern of external ridges and valleys of a fingerprint (2) an internal fingerprint pattern associated with internal finger tissue structures that give rise to the external ridges and valleys of a linger.

FIG. 5A shows an example of how illumination light from the one or more illumination light sources 436 propagates through the OLED display module 433, after transmitting through the lop transparent layer 431, and generates different returned light signals including light signals that carry fingerprint pattern information to the under-screen optical fingerprint sensor module. For simplicity, two illumination rays 80 and 82 at two different locations are directed to the top transparent layer 431 without experiencing total reflection at the interfaces of the top transparent layer 431. Specifically, the illumination light rays 80 and 82 are perpendicular or nearly perpendicular to the top layer 431. A finger 60 is in contact with the sensing zone 615 on the e top transparent layer 431. As illustrated, the illumination light beam 80 reaches to a finger ridge in contact with the top transparent layer 431 after transmitting through the top transparent layer 431 to generate the light beam 183 in the finger tissue and another light beam 181 back towards the LCD display module 433. The illumination light beam 82 reaches to a finger valley located above the top transparent layer 431 after transmitting through the top transparent layer 431 to generate the reflected light beam 185 from the interface with the top transparent layer 431 back towards the LCD display module 433, a second light beam 189 that enters the finger tissue and a third light beam 187 reflected by the finger valley.

In the example in FIG. 5A, it is assumed that the finger skin's equivalent index of refraction is about 1.44 at 550 nm and the cover glass index of refraction is about 1.51 for the top transparent layer 431. The finger ridge-cover glass interface reflects part of the beam 80 as reflected light 181 to bottom layers 524 below the LCD display module 433. The reflectance can be low, e.g., about 0.1% in some LCD panels. The majority of the light beam 80 becomes the beam 183 that transmits into the finger tissue 60 which causes scattering of the light 183 to produce the returned scattered light 191 towards the LCD display module 433 and the bottom layers 524. The flattering of the transmitted light beam 189 from the LCD pixel 73 in the finger tissue also contributes to the returned scattered light 191.

The beam 82 at the finger skin valley location 63 is reflected by the cover glass surface. In some designs, for example, the reflection may be about 3.5% as the reflected light 185 towards bottom layers 524, and the finger valley surface may reflect about 3.3% of the incident light power (light 187) to bottom layers 524 so that the total reflection may be about 6.8%. The majority light 189 is transmitted into the finger tissues 60. Part of the light power in the transmitted light 189 in the figure tissue is scattered by the tissue to contribute to the scattered light 191 towards and into the bottom layers 524.

Therefore, in the example in FIG. 5A, the light reflections from various interface or surfaces at finger valleys and finger ridges of a touching finger are different and the reflection ratio difference carries the fingerprint map information and can be measured to extract the fingerprint pattern of the portion that is in contact with the top transparent layer 431 and is illuminated the OLED light.

FIGS. 5B and 5C illustrate optical paths of two additional types of illumination light rays at the top surface tinder different conditions and at different positions relative to valleys or ridges of a finger, including under a total reflection condition at the interface with the top transparent layer 431. The illustrated illumination light rays generate different returned light signals including light signals that carry fingerprint pattern information to the under-screen optical fingerprint sensor module. It is assumed that the cover glass 431 and the LCD display module 433 are glued together without any air gap in between so that illumination light with a large incident angle to the cover glass 431 will be totally reflected at the cover glass-air interface. FIGS. 5A, 5B and 5C illustrate examples of three different groups divergent light beams: (1) central beams 82 with small incident angles to the cover glass 431 without the total reflection (FIG. 5A), (2) high contrast beams 201, 202, 211, 212 that are totally reflected at the cover glass 431 when nothing touches the cover glass surface and can be coupled into finger tissues when a finger touches the cover glass 431 (FIGS. 5B and 5C), and (3) escaping beams having very large incident angles that are totally reflected at the cover glass 431 even at a location where the finger issue is in contact.

For the central light beams 82, the cover glass surface in some designs may reflect about 0.1%-3.5% to light beam 185 that is transmitted into bottom layers 524, the finger skin may reflect about 0.1%-3.3% to light beam 187 that is also transmitted into bottom layers 524. The reflection difference is dependent on whether the light beams 82 meet with finger skin ridge 61 or valley 63. The rest light beam 189 is coupled into the finger tissues 60.

For high contrast light beams 201 and 202 meeting the local totally internal reflection condition, the cover glass surface reflects nearly 100% to light beams 205 and 206 respectively if nothing touches the cover glass surface. When the finger skin ridges touch the cover glass surface and at light beams 201 and 202 positions, most of the light power may be coupled into the finger tissues 60 by light beams 203 and 204.

For high contrast light beams 211 and 212 meeting the local totally internal reflection condition, the cover glass surface reflects nearly 100% to light beams 213 and 214 respectively if nothing touches the cover glass surface. When the finger touches the cover glass surface and the finger skin valleys happen to be at light beams 211 and 212 positions, no light power is coupled into finger tissues 60.

As illustrated in FIG. 5A, a portion of the illumination light that is coupled into finger tissues 60 tends to experience random scattering by the inner finger tissues to form low-contrast light 191 and part of such low-contrast light 191 can pass through the LCD display module 433 to reach to the optical fingerprint sensor module. This portion of light captured by optical fingerprint sensor module contains additional information on the finger skin color, blood characteristics and the finger inner tissue structures associated with the fingerprint. Additional features for using internally scattered light in tissues below the finger surface in optical sensing will be explained in later part of this patent document, such as obtaining an optical transmissive pattern of the finger that contains both (1) a two-dimensional spatial pattern of external ridges and Valleys of a fingerprint (2) an internal fingerprint pattern associated with internal finger tissue structures that give rise to the external ridges and valleys of a finger. Therefore, in high contrast light beams illuminated area, finger skin ridges and valleys cause different optical reflections and the reflection difference pattern carries the fingerprint pattern information. The high contrast fingerprint signals can be achieved by comparing the difference.

The disclosed under-screen optical sensing technology can be in various configurations to optically capture fingerprints based on the design illustrated in FIGS. 2A and 2B. For example, the specific implementation in FIG. 4B based on optical imaging by using a bulk imaging module in the optical sensing module can be implemented in various configurations.

Figure 6A:
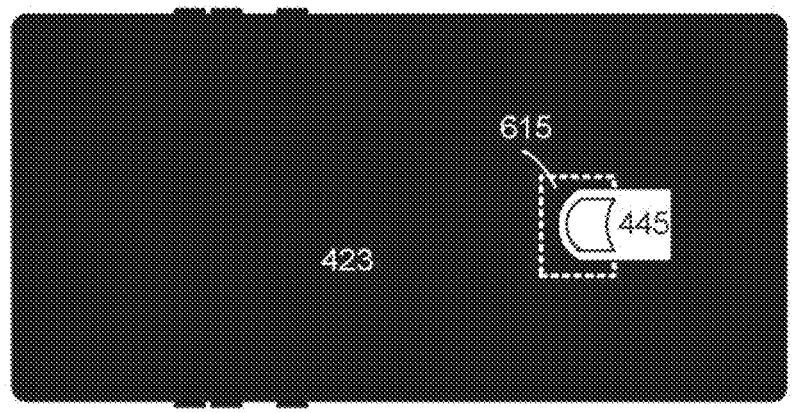
FIGS. 6A-6C, 7, 8A-8B, 9, and 10A-10B illustrate example designs of under-screen optical fingerprint sensor modules according to some embodiments.
Figure 6B:
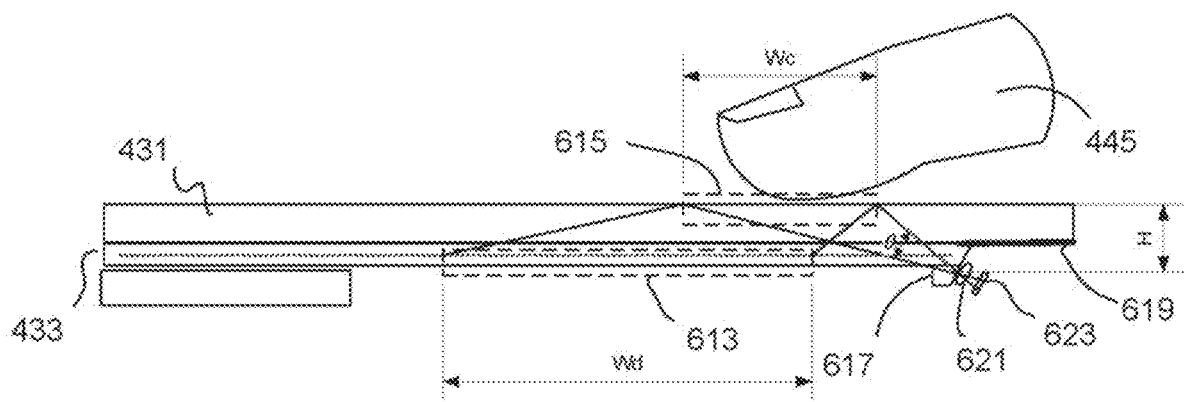
Figure 6C:
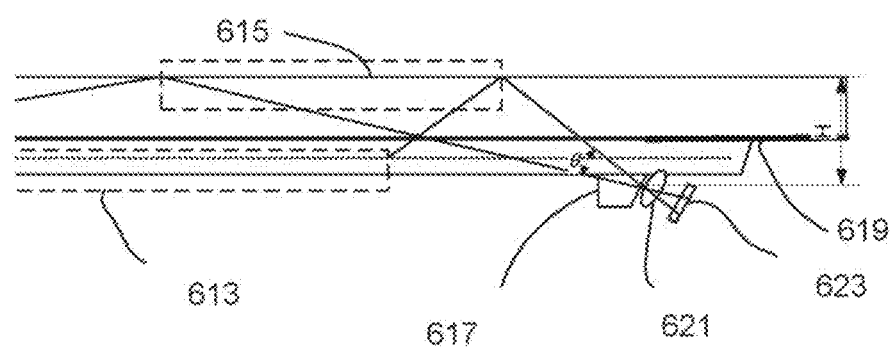

FIGS. 6A-6C show an example of an under-screen optical fingerprint sensor module based on optical imaging via a lens for capturing a fingerprint from a finger 445 pressing on the display cover glass 423. FIG. 6C is an enlarged view of the optical fingerprint sensor module part shown in FIG. 6B. The under-screen optical fingerprint sensor module as shown in FIG. 6B is placed under the LCD display module 433 includes an optically transparent spacer 617 that is engaged to the bottom surface of the LCD display module 433 to receive the returned light from the sensing zone 615 on the top surface of the top transparent layer 431, an imaging lens 621 that is located between and spacer 617 and the photodetector array 623 to image the received returned light from the sensing zone 615 onto the photodetector array 623. Different from FIG. 4B showing an example of an optical projection imaging system without a lens, the example of the imaging design in FIG. 6B used the imaging lens 621 to capture the fingerprint image at the photodetector array 623 and enables an image reduction by the design of the imaging lens 621. Similar to the imaging system in the example in FIG. 4B to some extent, this imaging system in FIG. 6B for the optical fingerprint sensor module can experience image distortions and a suitable optical correction calibration can be used to reduce such distortions, e.g., the distortion correction methods described for the system in FIG. 4B.

Similar to the assumptions in FIGS. 5A-5C, it is assumed that the finger skin's equivalent index of refraction to be about 1.44 at 550 nm and a bare cover glass index of refraction to be about 1.51 for the cover glass 423. When the OLED display module 433 is glued onto the cover glass 431 without any air gap, the total inner reflection happens in large angles at or larger than the critical incident angle for the interface. The total reflection incident angle is about 41.8° if nothing is in contact with the cover glass top surface, and the total reflection angle is about 73.7° if the finger skin touches the cover glass top surface. The corresponding total reflection angle difference is about 31.9°.

In this design, the micro lens 621 and the photodiode array 623 define a viewing angle θ for capturing the image of a contact finger in the sensing zone 615. This viewing angle can be aligned properly by controlling the physical parameters or configurations in order to detect a desired pan of the cover glass surface in the sensing zone 615. For example, the viewing angle may be aligned to detect the total inner reflection of the LCD display assembly. Specifically, the viewing angle θ is aligned to sense the effective sensing zone 615 on the cover glass surface. The effective sensing cover glass surface 615 may be viewed as a mirror so that the photodetector array effectively detects an image of the fingerprint illumination light zone 613 in the LCD display that is projected by the sensing cover glass surface 615 onto the photodetector array. The photodiode/photodetector array 623 can receive the image of the zone 613 that is reflected by the sensing cover glass surface 615. When a finger touches the sensing zone 615, some of the light can be coupled into the fingerprint's ridges and this will cause the photodetector array to receive light from the location of the ridges to appear as a darker image of the fingerprint. Because the geometries of the optical detection path are known, the fingerprint image distortion caused in the optical path in the optical fingerprint sensor module can be corrected.

Consider, as a specific example, that the distance H in FIG. 6B from the detection module central axis to the cover glass top surface is 2 mm. This design can directly cover 5 mm of an effective sensing zone 615 with a width Wc on the cover glass. Adjusting the spacer 617 thickness can adjust the detector position parameter H, and the effective sensing zone width Wc can be optimized. Because H includes the thickness of the cover glass 431 and the display module 433, the application design should take these layers into account. The spacer 617, the micro lens 621, and the photodiode array 623 can be integrated under the color coating 619 on the bottom surface of the top transparent layer 431.

Figure 7:
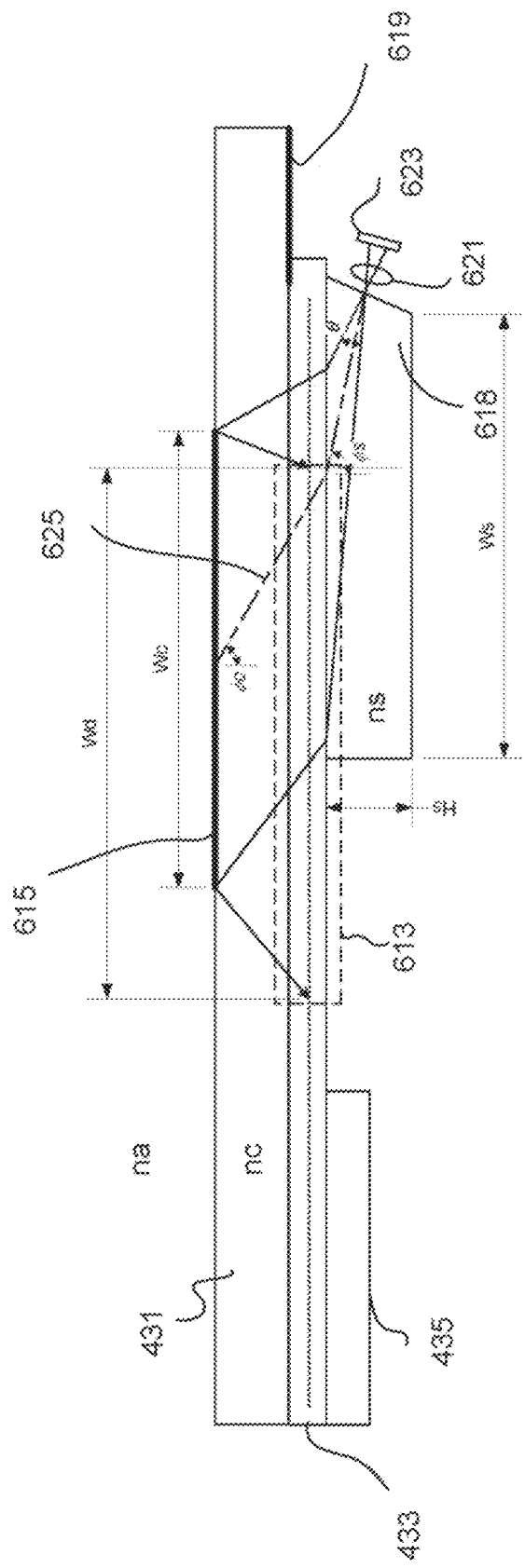

FIG. 7 shows an example of further design considerations of the optical imaging design for the optical fingerprint sensor module shown in FIGS. 6A-6C by using a special spacer 618 to replace the spacer 617 in FIGS. 6B-6C to increase the size of the sensing area 615. The spacer 618 is designed with a width Ws and thickness is Ms to have a low refraction index (RI) ns, and is placed under the LCD display module 433, e.g., being attached (e.g., glued) to the bottom surface the LCD display module 433. The end facet of the spacer 618 is an angled or slanted facet that interfaces with the micro lens 621. This relative position of the spacer and the lens is different from FIGS. 6B-6C, where the lens is placed underneath the spacer 617. The micro lens 621 and a photodiode array 623 are assembled into the optical detection module with a detection angle width θ. The detection axis 625 is bent due to optical refraction at the interface between the spacer 618 and display module 433 and at the interface between the cover glass 431 and the air. The local incident angle $\phi 1$ and $\phi 2$ are decided by the refractive indices RIs, ns, nc, and na of the materials for the components.

If nc is greater than ns, $\phi 1$ is greater than $\phi 2$. Thus, the refraction enlarges the sensing width Wc. For example, assuming the finger skin's equivalent RI is about 1.44 at 550 nm and the cover glass index RI is about 1.51, the total reflection incident angle is estimated to be about 41.8° if nothing touches the cover glass top surface, and the total reflection angle is about 73.7° if the finger skin touches the cover glass top surface. The corresponding total reflection angle difference is about 31.9°. If the spacer 618 is made of same material of the cover glass, and the distance from the detection module center to the cover glass top surface is 2 mm, if detection angle width is θ=31.9°, the effective sensing area width Wc is about 5 mm. The corresponding central axis's focal incident angle is $\phi 1 = \phi 2 = 57.75°$. If the material for the special spacer 618 has a refractive index ns about 1.4, and Hs is 1.2 mm and the detection module is tilted at $\phi 1 = 70°$. The effective sensing area width is increased to be greater than 6.5 mm. Under those parameters, the detection angle width in the cover glass is reduced to 19°. Therefore, the imaging system for the optical fingerprint sensor module can be designed to desirably enlarge the size of the sensing area 615 on the top transparent layer 431.

the refractive index RI of the special spacer 618 is designed to be sufficiently low (e.g., to use $MgF_2$, $CaF_2$, or even air to form the spacer), the width Wc of the effective sensing area 615 is no longer limited by the thickness of the cover glass 431 and the display module 433. This property provides desired design flexibility. In principle, if the detection module has a sufficient resolution, the effective sensing area may even be increased to cover the entire display screen.

Since the disclosed optical sensor technology can be used to provide a large sensing area for capturing a pattern, the disclosed under-screen optical fingerprint sensor modules may be used to capture and detect not only a pattern of a finger but a larger size patter such a person's palm that is associated with a person for user authentication.

Figure 8A:
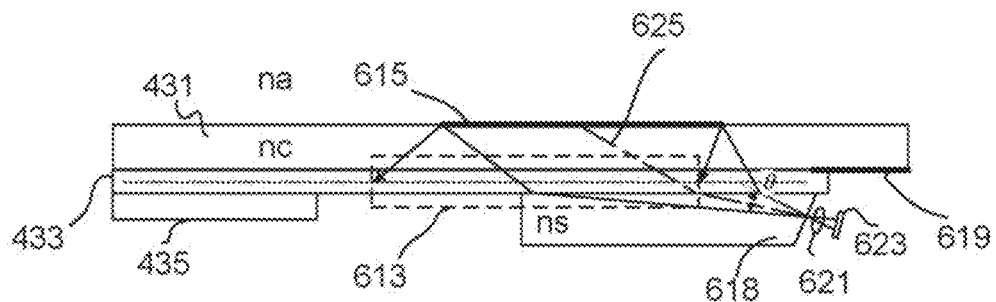
Figure 8B:
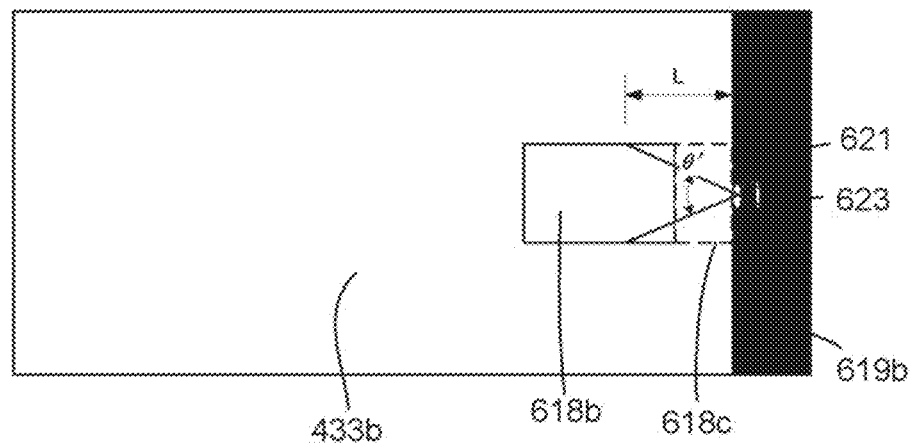

FIGS. 8A-8B show an example of further design considerations of the optical imaging design for the optical fingerprint sensor module shown in FIG. 7 by setting the detection angle θ' of the photodetector array relative in the display screen surface and the distance L between the lens 621 and the spacer 618. FIG. 8A shows a cross-sectional view along the direction perpendicular to the display screen surface, and FIG. 8B shows a view of the device from either the bottom or top of the displace screen. A filling material 618c can be used to fill the space between the lens 621 and the photodetector array 623. For example, the filling material 618c can be same material of the special spacer 618 or another different material. In some designs, the filling material 618c may the air space.

Figure 9:
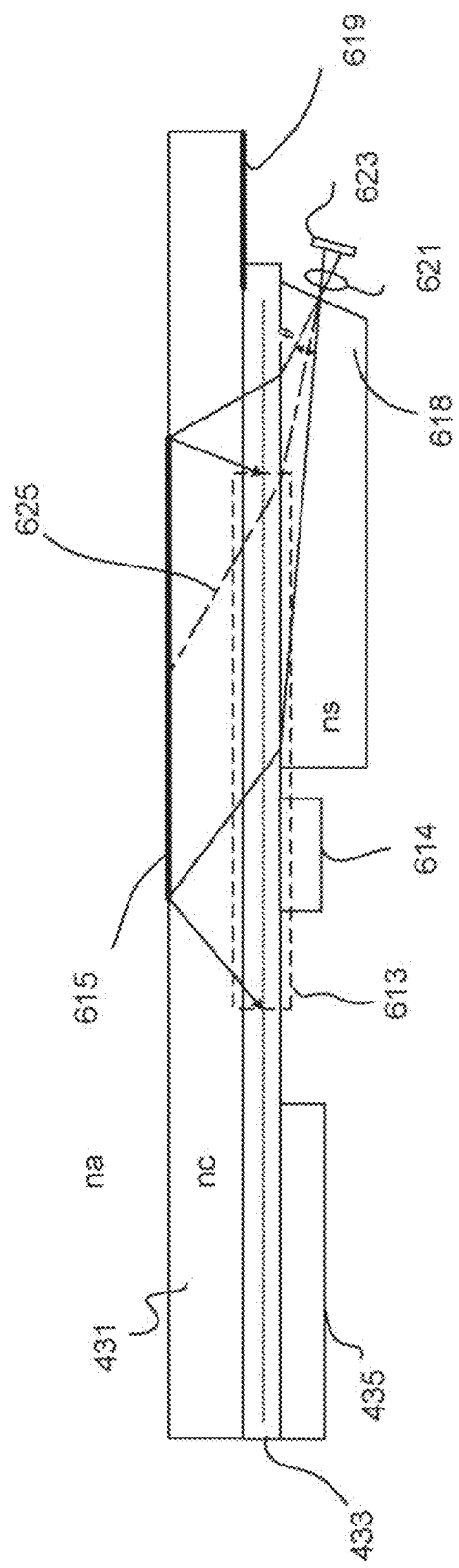

FIG. 9 shows another example of an under-screen optical fingerprint sensor module based on the design in FIG. 7 where one or more illumination light sources 614 are provided to illuminate the top surface sensing zone 615 for optical fingerprint sensing. The illumination light sources 614 may be of an expanded type, or be a collimated type so that all the points within the effective sensing zone 615 is illuminated. The illumination light sources 614 may be a single element light source or an array of fight sources.

Figure 10A:
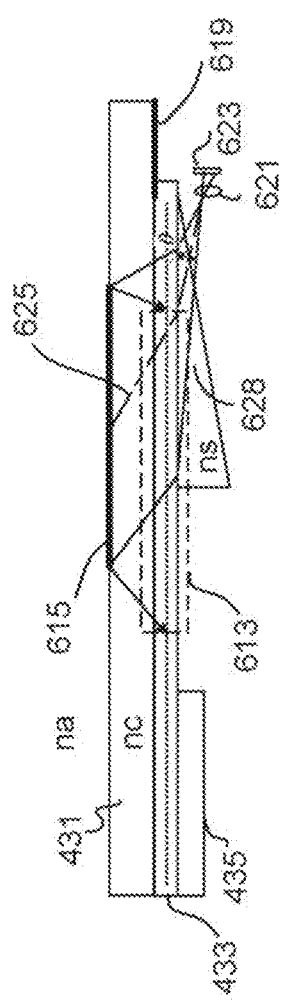
Figure 10B:
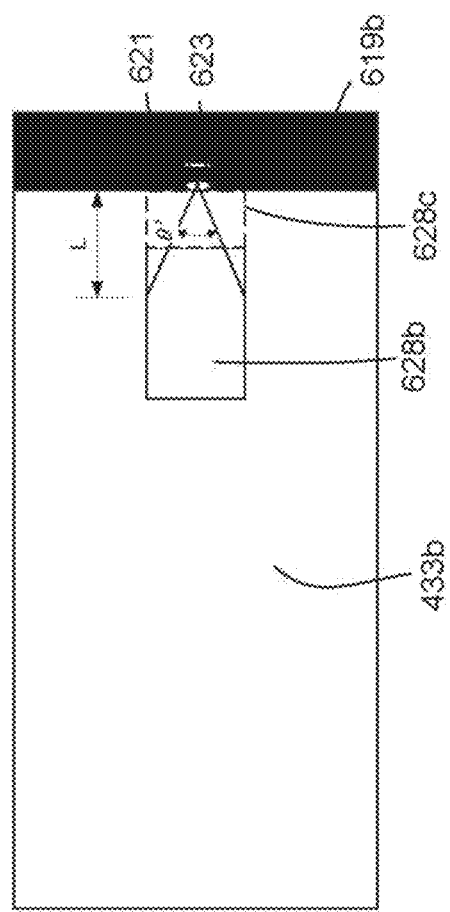

FIGS. 10A-10B show an example of an under-screen optical fingerprint sensor module that uses an optical coupler 628 shaped as a thin wedge to improve the optical detection at the optical sensor array 623. FIG. 10A shows a cross section of the device structure with an under-screen optical fingerprint sensor module for fingerprint sensing and FIG. 10B shows a top view of the device screen. The optical wedge 628 (with a refractive index ns) is located below the display panel structure to modify a total refection condition on a bottom surface of the display panel structure that interfaces with the optical wedge 628 to permit extraction of light out of the display panel structure through the bottom surface. The optical sensor array 623 receives the light from the optical wedge 628 extracted from the display panel structure and the optical imaging module 621 is located between the optical wedge 628 and the optical sensor array 623 to image the light from the optical wedge 628 onto the optical sensor array 623. In the illustrated example, the optical wedge 628 includes a slanted optical wedge surface facing the optical imaging module and the optical sensing array 623. Also, as shown, there is a free space between the optical wedge 628 and the optical imaging module 621.

If the light is totally reflected at the sensing surface of the cover glass 431, the reflectance is 100%, of the highest efficiency. However, the light will also be totally reflected at the LCD bottom surface 433b if it is parallel to the cover glass surfaces. The wedge coupler 628 is used to modify the local surface angle so that the light can be coupled out for the detection at the optical sensor stray 623. The micro holes in the LCD display module 433 provide the desired light propagation path for light to transmit through the LCD display module 433 for the under-screen optical sensing. The actual light transmission efficiency may gradually be reduced if the light transmission angle becomes too large or when the TFT layer becomes too thick. When the angle is close to the total reflection angle, namely about 41.8° when the cover glass refractive index is 1.5, the fingerprint image looks good. Accordingly, the wedge angle of the wedge coupler 628 may be adjusted to be of a couple of degrees so that the detection efficiency can be increased or optimized. If the cover glass' refractive index is selected to be higher, the total reflection angle becomes smaller. For example, if the cover glass is made of Sapphire which refractive index is about 1.76, the total reflection angle is about 34.62°. The detection light transmission efficiency in the display is also improved. Therefore, this design of using a thin wedge to set the detection angle to be higher than the total reflection angle, and/or to use high refractive index cover glass material to improve the detection efficiency.

In some under-screen optical fingerprint sensor module designs (e.g., those illustrated in FIGS. 6A-6C, 7, 8A, 8B, 9, 10A, and 10B), the sensing area 615 on the top transparent surface is not vertical or perpendicular to the detection axis 625 of the optical fingerprint sensor module so that the image plane of the sensing area is also not vertical or perpendicular to the detection axis 625. Accordingly, the plane of the photodetector array 623 can be tilted relative the detection axis 625 to achieve high quality imaging at the photodetector array 623.

Figure 11A:
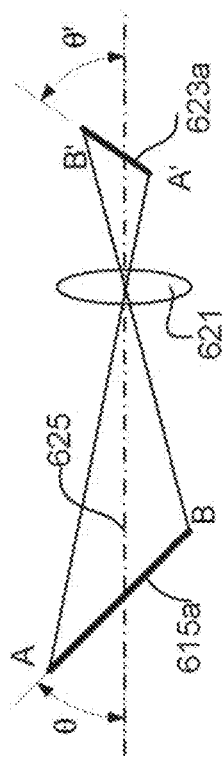
FIGS. 11A-11C illustrate imaging of the fingerprint sensing area on the top transparent layer via an imaging module under different tiling conditions where an imaging device images the fingerprint sensing area onto an optical sensor array and the imaging device may be optically transmissive or optically reflective according to some embodiments.
Figure 11B:
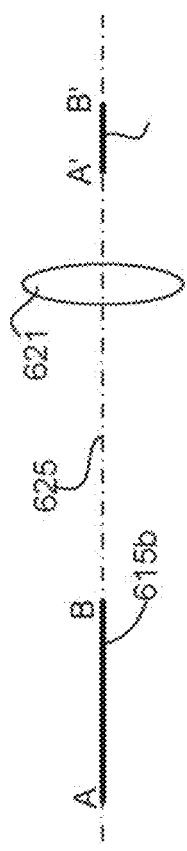
Figure 11C:
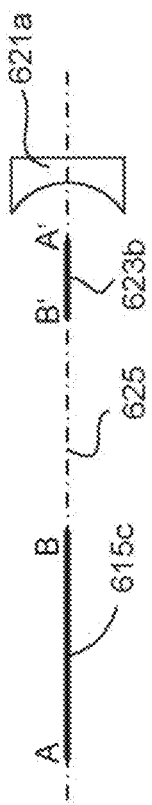

FIGS. 11A-11C show three example configurations for this tilting. FIG. 11A shows the sensing area 615a is tilted and is not perpendicular the detection axis 625. In FIG. 11B, the sensing area 615b is aligned to be on the detection axis 625, such that its image plane will also be located on the detection axis 625. In practice, the lens 621 can be partially cut off so as to simplify the package. In various implementations, the micro lens 621 can also be of transmission type or reflection type. For example, a specified approach is illustrated in FIG. 11C. The sensing area 615c is imaged by an imaging mirror 621a. A photodiode array 623b is aligned to detect the signals.

In the above designs where the lens 621 is used, the lens 621 can be designed to have an effective aperture that is larger than the aperture of the holes in the LCD display layers that allow transmission of light through the LCD display module for optical fingerprint sensing. This design can reduce the undesired influence of the wiring structures and other scattering objects in the LCD display module.

Figure 12:
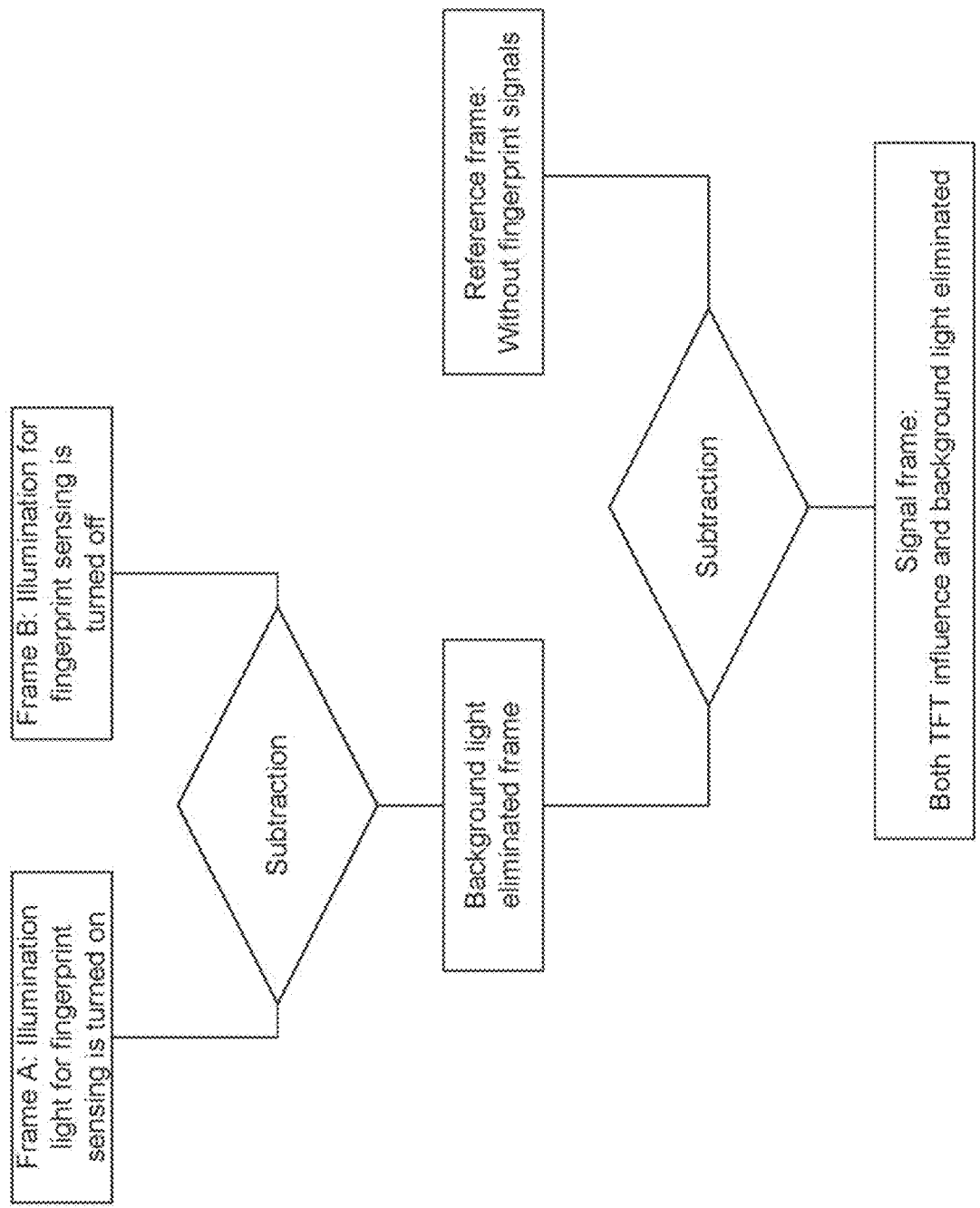
FIG. 12 is a flowchart illustrating an exemplary operation of a fingerprint sensor for reducing or eliminating undesired contributions from the background light in fingerprint sensing according to some embodiments.

FIG. 12 shows an example of an operation of the fingerprint sensor for reducing or eliminating undesired contributions from the background light in fingerprint sensing. The optical sensor array can be used to capture various frames and the captured frames can be used to perform differential and averaging operations among multiple frames to reduce the influence of the background light. For example, in frame A, the illumination light source for optical fingerprint sensing is turned on to illuminate the finger touching area, in frame B the illumination is changed or is turned off. Subtraction of the signals of frame B from the signals of frame A can be used in the image processing to reduce the undesired background light influence.

The undesired background light in the fingerprint sensing may also be reduced by providing proper optical filtering in the light path. One or more optical filters may be used to reject the environment light wavelengths, such as near IR and partial of the red light etc. In some implementation, such optical filter coatings may be made on the surfaces of the optical parts, including the display bottom surface, prism surfaces, sensor surface etc. For example, human fingers absorb most of the energy of the wavelengths under ~580 nm, if one or more optical filters or optical filtering coatings can be designed to reject light in wavelengths from 580 nm to infrared, undesired contributions to the optical detection in fingerprint sensing from the environment light may be greatly reduced.

Figure 13:
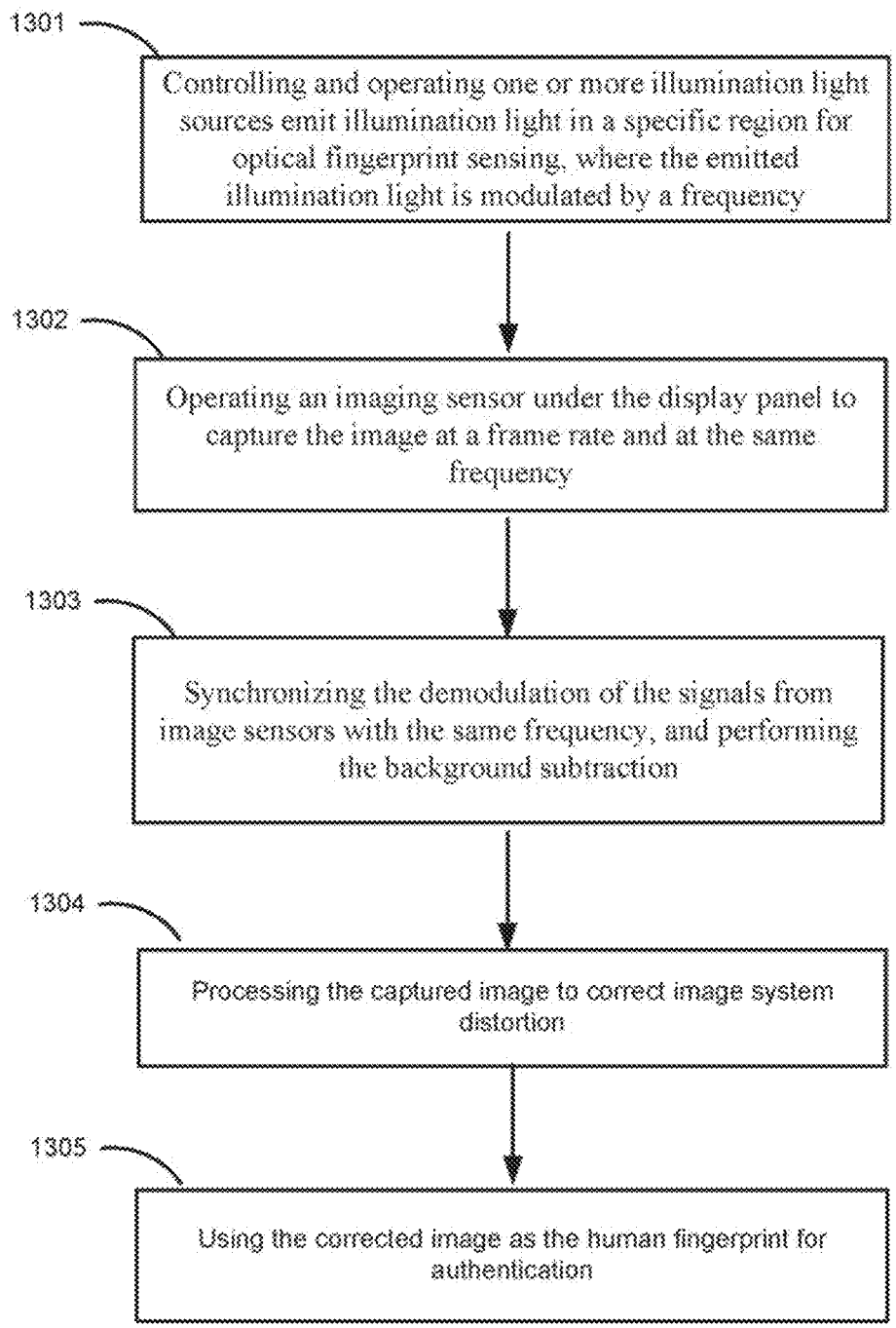
FIG. 13 is a flowchart illustrating an exemplary process for operating an under-screen optical fingerprint sensor module for capturing a fingerprint pattern according to some embodiments.

FIG. 13 shows an example of an operation process for correcting the image distortion in the optical fingerprint sensor module. At step 1301, the one or more illumination light sources are controlled and operated to emit light in a specific region, and the light emission of such pixels is modulated by a frequency F. Ate step 1302, an imaging sensor under the display panel is operated to capture the image at frame rate at same frequency F. In the optical fingerprint sensing operation, a finger is placed on top of the display panel cover substrate and the presence of the finger modulates the light reflection intensity of the display panel cover substrate top surface. The imaging sensor under the display captures the fingerprint modulated reflection light pattern. At step 1303, the demodulation of the signals from image sensors is synchronized with the frequency F, and the background subtraction is performed. The resultant image has a reduced background light effect and includes images from pixel emitting tights. At step 1304, the capture image is processed and calibrated to correct image system distortions. At step 1305, the corrected image is used as a human fingerprint image for user authentication.

The same optical sensors used for capturing the fingerprint of a user can be used also to capture the scattered light from the illuminated finger as shown by the back scattered light 191 in FIG. 5A. The detector signals from the back scattered light 191 in FIG. 5A in a region of interest can be integrated to produce an intensity signal. The intensity variation of this intensity signal is evaluated to determine other parameters beyond the fingerprint pattern, e.g., the heart rate of the user or inner topological tissues of a finger associated with the external fingerprint pattern.

The above fingerprint sensor may be hacked by malicious individuals who can obtain the authorized user's fingerprint, and copy the stolen fingerprint pattern on a carrier object that resembles a human linger Such unauthorized fingerprint patterns may be used on the fingerprint sensor to unlock the targeted device. Hence, a fingerprint pattern, although a unique biometric identifier, may not be by itself a completely reliable or secure identification. The under-screen optical fingerprint sensor module can also be used to as an optical anti-spoofing sensor for sensing whether an input object with fingerprint patterns is a finger from a living person and for determining whether a fingerprint input is a fingerprint spoofing attack. This optical anti-spoofing sensing function can be provided without using a separate optical sensor. The optical anti-spoofing can provide high-speed responses without compromising the overall response speed of the fingerprint sensing operation.

Figure 14:
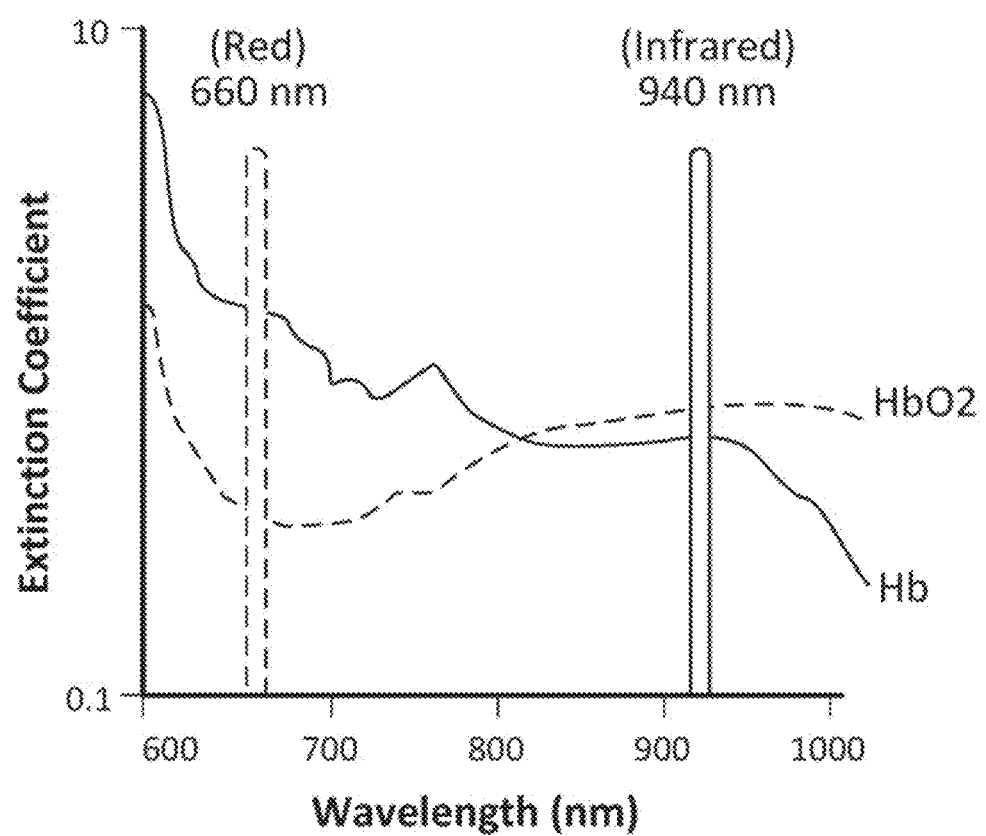
FIGS. 14-16 illustrates exemplary operation processes for determining whether an object in contact with the LCD display screen is pan of a finger of a live person by illuminating the finger with light in two different light colors according to some embodiments.

FIG. 14 shows exemplary optical extinction coefficients of materials being monitored in blood where the optical absorptions are different between the visible spectral range e.g., red light at 660 nm and the infrared range, e.g., IR light at 940 nm. By using probe light to illuminate a finger at a first visible wavelength (Color A) and a second different wavelength such as an infrared (IR) wavelength (Color B), the differences in the optical absorption of the input object can be captured determine whether the touched object is a finger from a live person. The one or more illumination light sources for providing the illumination for optical sensing can be used to emit light of different colors to emit probe or illumination light at least two different optical wavelengths to use the different optical absorption behaviors of the blood for live finger detection. When a person' heart beats, the pulse pressure pumps the blood to flow in the arteries, so the extinction ratio of the materials being monitored in the blood changes with the pulse. The received signal carries the pulse signals. These properties of the blood can be used to detect whether the monitored material is a live-fingerprint or a fake fingerprint.

Figure 15:
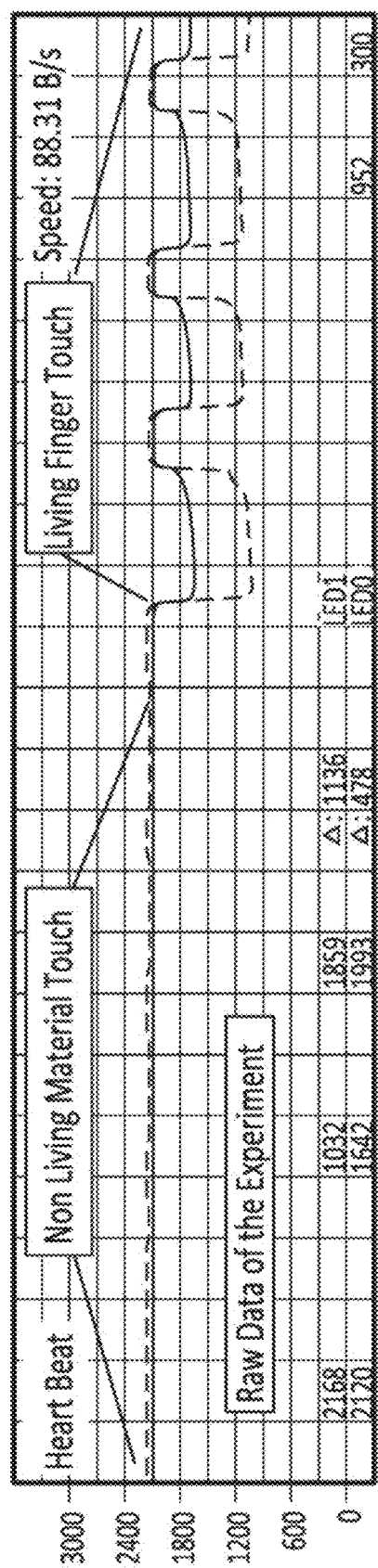

FIG. 15 shows a comparison between optical signal behaviors in the reflected light from a nonliving material (e.g., a fake finger or a spoof device with a fabricated fingerprint pattern) and a live finger. The optical fingerprint sensor can also operate as a heartbeat sensor to monitor a living organism. When two or more wavelengths of the probe light are detected, the extinction ratio difference can be used to quickly determine whether the monitored material is a living organism, such as live fingerprint. In the example shown in FIG. 15, probe light at different wavelengths were used, one at a visible wavelength and another at an IR wavelength as illustrated in FIG. 14.

When a nonliving material touches the top cover glass above the fingerprint sensor module, the received signal reveals strength levels that are correlated to the surface pattern of the nonliving material and the received signal does not contain signal components associated with a finger of a living person. However, when a finger of a living person touches the top cover glass, the received signal reveals signal characteristics associated with a living person, including obviously different strength levels because the extinction ratios are different for different wavelengths. This method does not take long time to determine whether the touching material is a part of a living person. In FIG. 15, the pulse-shaped signal reflects multiple touches instead of blood pulse. Similar multiple touches with a nonliving material does not show the difference caused by a living finger.

This optical sensing of different optical absorption behaviors of the blood at different optical wavelengths can be performed in a short period for live finger detection and can be faster than optical detection of a person's heart beat using the same optical sensor.

In LCD displays, the LCD backlighting illumination light is white light and thus contains light at both the visible and IR spectral ranges for performing the above live finger detection at the optical fingerprint sensor module. The LCD color filters in the LCD display module can be used to allow the optical fingerprint sensor module to obtain measurements in FIGS. 14 and 15. In addition, the designated light sources 436 for producing the illumination light for optical sensing can be operated to emit probe light at the selected visible wavelength and IR wavelength at different times and the reflected probe light at the two different wavelengths is captured by the optical detector array 623 to determine whether touched object is a live finger based on the above operations shown in FIGS. 14 and 15. Notably, although the reflected probe light at the selected visible wavelength and IR wavelength at different times may reflect different optical absorption properties of the blood, the fingerprint image is always captured by both the probe light the selected visible wavelength and the probe light at the IR wavelength at different times. Therefore, the fingerprint sensing can be made at both the visible wavelength and IR wavelength.

Figure 16:
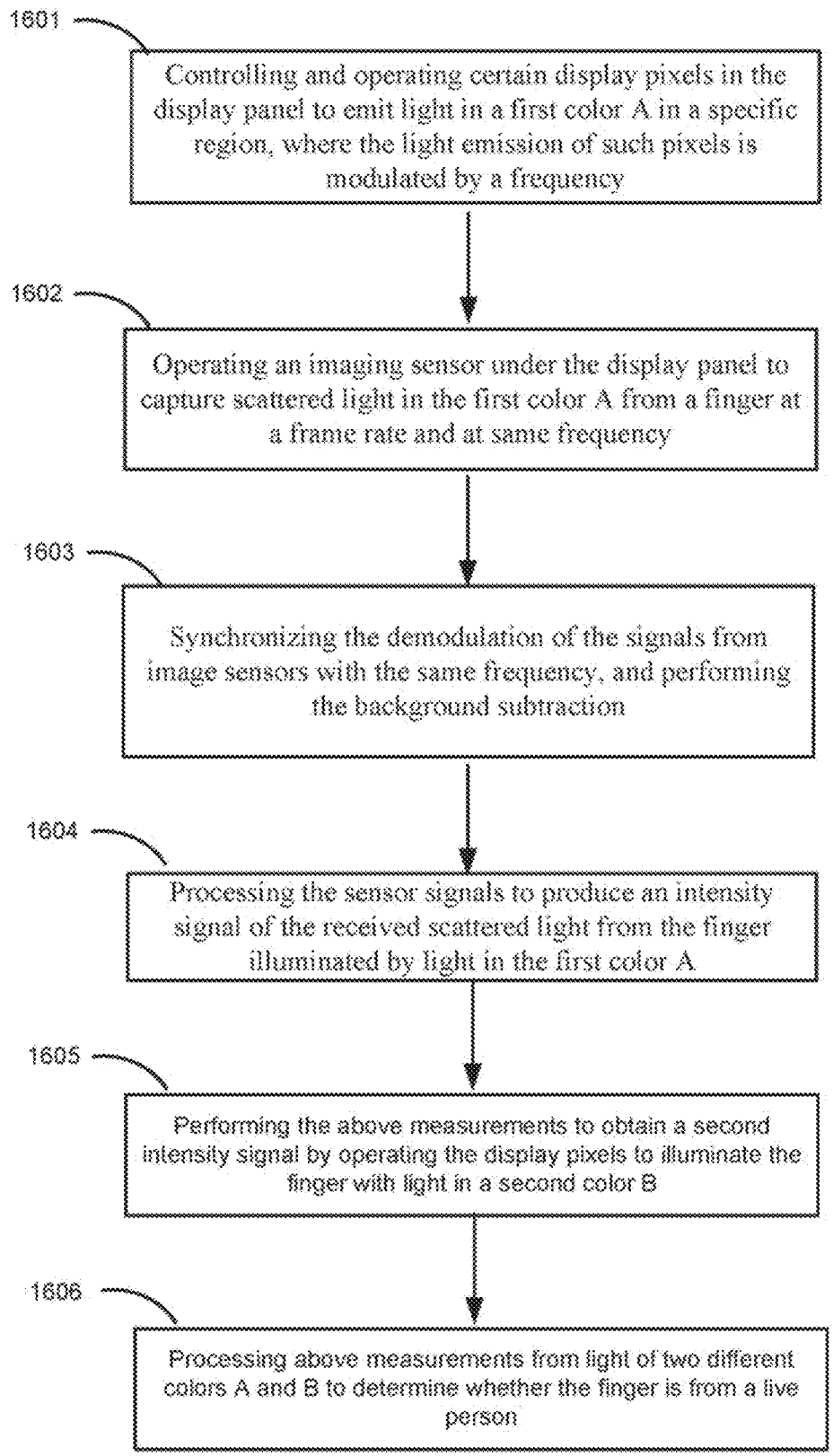

FIG. 16 shows an example of an operation process for determining whether an object in contact with the LCD display screen is part of a finger of a live person by operating the one or more illumination light sources for optical sensing to illuminate the finger with light in two different light colors.

For yet another example, the disclosed optical sensor technology can be used to detect whether the captured or detected pattern of a fingerprint or palm is from a live person's hand by a "live finger" detection mechanism by other mechanisms other than the above described different optical absorptions of blood at different optical wavelengths. For example, a live person's finger tends to be moving or stretching due to the person's natural movement or motion (either intended or unintended) or pulsing when the blood flows through the person's body in connection with the heartbeat. In one implementation, the optical fingerprint sensor module can detect a change in the returned light from a finger or palm due to the heartbeat/blood flow change and thus to detect whether there is a live heartbeat in the object presented as a finger or palm. The user authentication can be based on the combination of the both the optical sensing of the fingerprint/palm pattern and the positive determination of the presence of a live person to enhance the access control. For yet another example, as a person touches the LCD display screen, a change in the touching force can be reflected in one or more ways, including fingerprint pattern deforming, a change in the contacting area between the finger and the screen surface, fingerprint ridge widening, or a change in the blood flow dynamics. Those and other changes can be measured by optical sensing based on the disclosed optical sensor technology and can be used to calculate the touch force. This touch force sensing can be used to add more functions to the optical fingerprint sensor module beyond the fingerprint sensing.

In the above examples where the fingerprint pattern is captured on the optical sensor array via an imaging module, as in FIG. 4B and FIG. 6B, optical distortions tend to degrade the image sensing fidelity. Such optical distortions can be corrected in various ways. For example, a known pattern can be used to generate an optical image at the optical sensor array and the image coordinates in the know pattern can be correlated to the generated optical image with distortions at the optical sensor array for calibrating the imaging sensing signals output by the optical sensor array for fingerprint sensing. The fingerprint sensing module calibrates the output coordinates referencing on the image of the standard pattern.

In light of the disclosure in this patent document, various implementations can be made for the optical fingerprint sensor module as disclosed. For example, a display panel can be constructed in which each pixel emitting lights, and can be controlled individually; the display panel includes an at least partially transparent substrate; and a cover substrate, which is substantially transparent. An optical fingerprint sensor module is placed under the display panel to sense the images form on the top of the display panel surface. The optical fingerprint sensor module can be used to sense the images form from light emitting from display panel pixels. The optical fingerprint sensor module can include a transparent block with refractive index lower than the display panel substrate, and an imaging sensor block with an imaging sensor array and an optical imaging lens. In some implementations, the low refractive index block has refractive index in the range of 1.35 to 1.46 or 1 to 1.35.

For another example, a method can be provided for fingerprint sensing, where light emitting from a display panel is reflected off the cover substrate, a finger placed on top of the cover substrate interacts with the light to modulate the light reflection pattern by the fingerprint. An imaging sensing module under the display panel is used to sense the reflected light pattern image and reconstruct fingerprint image. In one implementation, the emitting light from the display panel is modulated in time domain, and the imaging sensor is synchronized with the modulation of the emitting pixels, where a demodulation process will reject most of the background light (light not from pixels being targeted).

As described above, display screens of portable electronic devices are often implemented as an assembly of multiple layers. For example, display screens implemented as touch-screens can include display layers for outputting video data, capacitive touchscreen layers for detecting touch events, a hard top layer, etc. Additional layers are used to integrate under-display optical sensing capabilities, such as fingerprint sensing. For light to reach the sensing components, the light passes through the various layers between the top surface and the sensors (e.g., the photodetectors). To that end, the layers are designed to permit transmission of light, and some layers can be designed to enhance, bend, focus, collimate, reflect, and/or otherwise influence transmission of light through the layers.

Figure 17A:
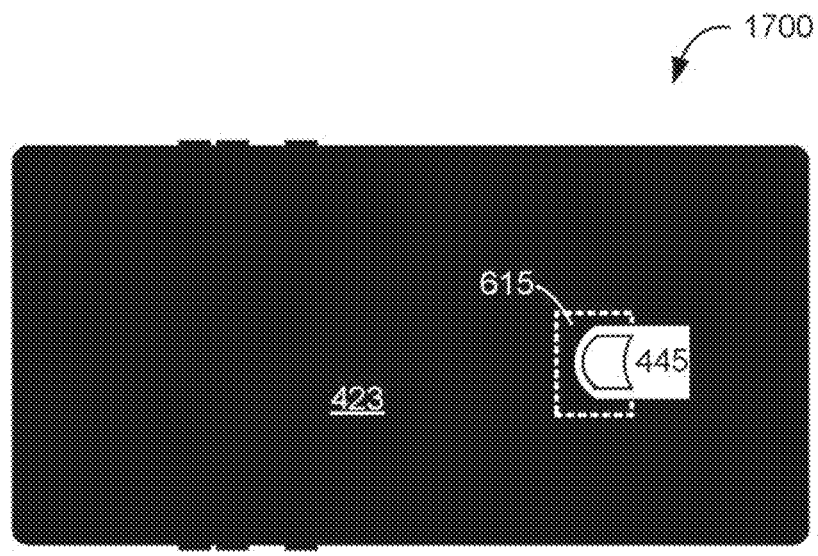
FIGS. 17A and 17B show an illustrative portable electronic device, and a cross-section of an illustrative display module for such a portable electronic device, respectively, according to various embodiments.
Figure 17B:
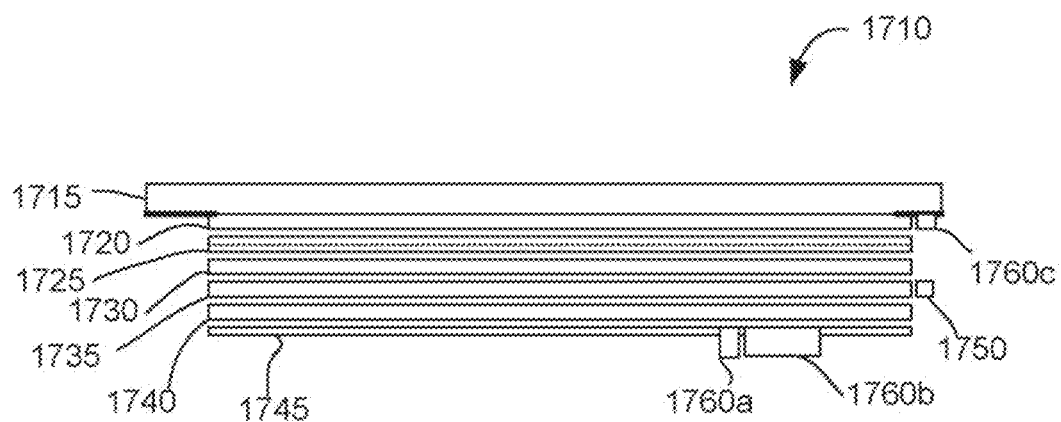

FIGS. 17A and 17B show an illustrative portable electronic device 1700, and a cross-section of an illustrative display module 1710 for such a portable electronic device 1700, respectively, according to various embodiments. The portable electronic device 1700 is illustrated as a smart phone. In other implementations, the portable electronic device 1700 is a laptop computer, a tablet computer, a wearable device, or any other suitable computational platform. The portable electronic device 1700 can include a display system 423. As described above, the display system 423 can be a touch sensing display system 423. The display system 423 has, integrated therein, an under-display optical sensor. As illustrated, the under-display optical sensor can define a sensing region 615, within which optical sensing can be performed. For example, fingerprint scanning can be performed by the under-display optical sensor when a user places a finger 445 on the display within the sensing region 615. Such an under-display optical sensor can be implemented using multiple layers.

The display module 1710 of FIG. 17B can be an implementation of the display system 423 of FIG. 17A. As illustrated, the display module 1710 includes a number of layers. A top cover layer 1715 (e.g., glass) can serve as a user interface surface for various user interfacing operations. For example, the cover layer 1715 can facilitate touch sensing operations by the user, displaying images to the user, an optical sensing interface to receive a finger for optical fingerprint sensing and other optical sensing operations, etc. In some embodiments, the display module 1710 includes the cover layer 1715. In other implementations, the cover layer 1715 is separate from the display module 1710. For example, the display module 1710 is integrated into the portable electronic device 1700 as a module, and the cover layer 1715 is installed on top of the display module 1710.

One or more other layers of the display module 1710 form a liquid crystal module (LCM) 1720. Below the LCM 1720, the display module 1710 includes an enhancement layer 1725. As described herein, the enhancement layer 1725 can include one or more layers of brightness-enhancement film, such as enhancement films including trapezoidal prism structures. The display module 1710 can further include some or all of a light diffuser 1730, a light guide plate 1735, a reflector film 1740, and a frame 1745. Some embodiments include additional components, such as one or more display light sources 1750, and one or more external light sources 1760 (e.g., for fingerprint and/or other optical sensing).

Implementations of the display light sources 1750 can include LCD display backlighting light sources (e.g., LED lights) that provide white backlighting for the display module 1710. Implementations of the light guide plate 1735 include a waveguide optically coupled with the display light sources 1750 to receive and guide the backlighting light. Implementations of the LCM 1720 include some or all of a layer of liquid crystal (LC) cells. LCD electrodes, a transparent conductive ITO layer, an optical polarizer layer, a color filter layer, a touch sensing layer, etc. Implementations of the light diffuser 1730 include a backlighting diffuser placed underneath the LCM 1720 and above the light guide plate 1735 to spatially spread the backlighting light for illuminating the LCD display pixels in the LCM 1720. Implementations of the reflector film 1740 are placed underneath the light guide plate 1735 to recycle backlighting light towards the LCM 1720 for improved light use efficiency and display brightness.

When the LCD cells in (e.g., in the sensing region 615) are turned on, the LCM 1720 (e.g., the LC cells, electrodes, transparent ITO, polarizer, color filter, touch sensing layer, etc.) can become partially transparent, although the micro structure may interfere and/or block some probe light energy. Embodiments of the light diffuser 1730, the light guide plate 1735, the reflector film 1740, and the frame 1745 are treated to hold the fingerprint sensor and provide a transparent or partially transparent sensing light path, so that a portion of the reflected light from the top surface of the cover layer 1715 can reach sensing elements (e.g., a photo detector array) of the under-display optical sensor. The under-display optical sensor can include any suitable components, such as fingerprint sensor pans, a photodetector array, an optical collimator array for collimating and directing reflected probe light to the photo detector array, and an optical sensor circuit to receive and condition detector output signals from the photo detector array. Embodiments of the photodetector array include a CMOS sensor of CMOS sensing pixels, a CCD sensor array, or any other suitable optical sensor array.

Figure 18A:
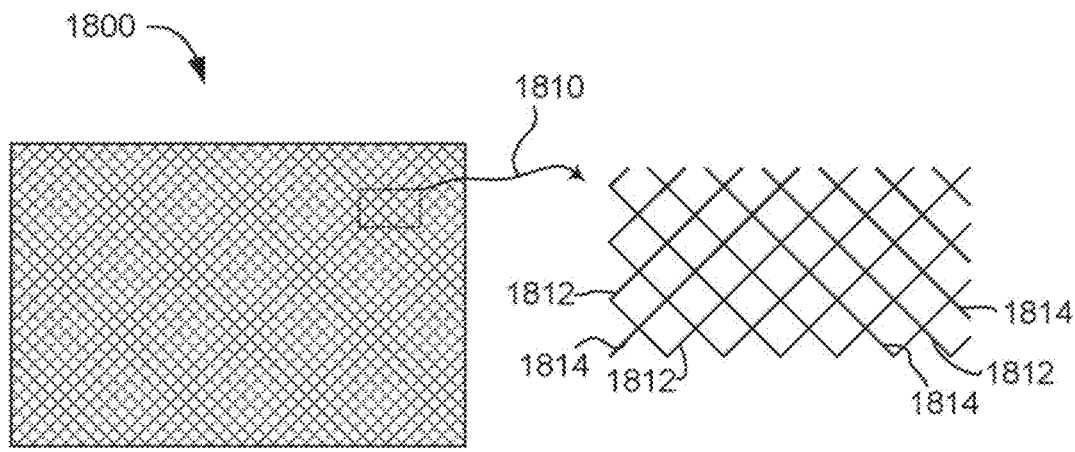
FIGS. 18A-18C show views of an illustrative portion of a symmetric enhancement layer.
Figure 18B:
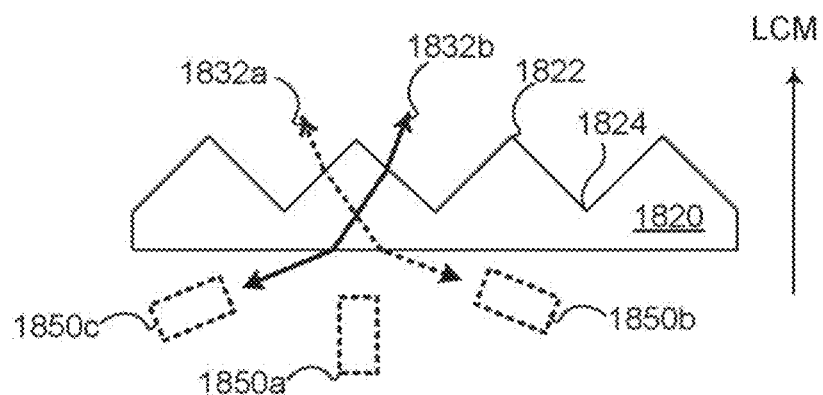
Figure 18C:
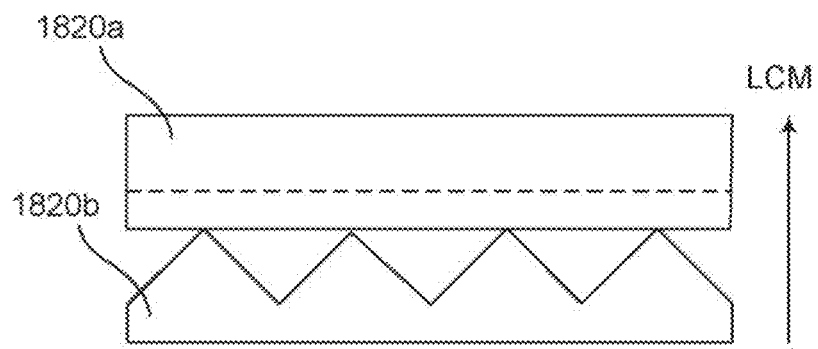

Embodiments of the enhancement layer 1725 include one or more enhancement films. Some enhancement film designs include a prism film with sharp prism ridge and sharp prism valley profile (i.e., a sharp transition at each ridge, and a sharp transition at each Valley). For example, FIGS. 18A-18C show views of an illustrative portion of a symmetric enhancement layer 1800. FIG. 18A illustrates a zoomed-in view 1810 of a small portion of the symmetric enhancement layer 1800 FIGS. 18B and 18C show a cross-section of a small portion of one enhancement film layer 1820 of the symmetric enhancement layer 1800. FIG. 18C shows a cross-section of a small portion of two enhancement film layers 1820a, 1820b of the symmetric enhancement layer 1800, stacked in orthogonal orientations with respect to each other.

As illustrated, each enhancement film layer 1820 is formed with a series of sharp prism structures. Each sharp prism structure includes a sharp ridge 1822 and a sharp valley 1824. The zoomed-in view 1810 of FIG. 18A shows the two enhancement film layers 1820 of FIG. 18C, stacked in orthogonal orientations with respect to each other, viewed from the top. As illustrated, the intersecting sharp prism structures form a grid of sharp ridge lines 1812 and sharp valley lines 1814, corresponding respectively to the sharp ridges 1822 and sharp valleys 1824 of each sharp prism structure. As illustrated by FIG. 18C, the sharp ridges 1822 point in the direction of the LCM 1720.

Such enhancement layers 1800 typically seek to enhance the brightness of light directed toward a viewer, such as toward and/or through the LCM 1720. For example, enhancement layers 1800 seek to enhance the brightness of backlighting positioned behind the LCM 1720 and/or of probe lighting used for under-display optical sensing. As shown in FIG. 18B, light passing through the prism structures of the enhancement layer 1800 is bent in different directions, as illustrated by light paths 1832a and 1832b. Each light path 1832 illustrates two directions of travel of light energy. A first direction (i.e., generally toward the LCM 1720) can represent a vector of backlighting and/or probe lighting energy that originated from a light source under the enhancement layers 1800. A second direction (i.e., generally away from the LCM 1720) can represent a vector of backlighting and/or probe lighting energy that reflected off of another layer (e.g., the top transparent layer above the LCM 1720) and is traveling back in the direction of under-display optical sensors.

As light passes through the enhancement film layer 1820 in the direction of the LCM 1720, such bending can tend to be beneficial. For example, light passing through the enhancement film layer 1820 in the first direction, including light paths (e.g., paths 1832) having large incident angles, can be bent in a generally convergent manner toward the LCM 1720, thereby causing brightness enhancement. As a corollary, light passing through the enhancement layers 1800 in the second direction can tend to be bent in a generally divergent manner. If optical sensing is attempted in that causes image blurring. In typical display applications, such blurring is of no concern, as the blurred light is passing into the device and not toward the viewer. However, in context of under-display optical fingerprint sensing, as described herein, such blurring impacts light traveling in the direction of the optical sensing components, which can frustrate optical sensing by components situated below the conventional enhancement layer 1800.

For added clarity, FIG. 18B shows three example potential reference positions (e.g., locations and orientations) 1850 for optical sensing, if an optical sensor is placed in accordance with reference position 1850a, the optical sensor can tend to detect light entering the enhancement film layer 1820 through the right and left prism faces, which can tend to cause image blurring. However, if an optical sensor is placed in accordance with reference position 1850b or 1850c, the optical sensor can tend to detect light entering the enhancement film layer 1820 through only the right prism faces or the left prism faces, respectively. In such cases, blurring can be avoided, but at least half of the detection area may not be imaged.

Figure 19A:
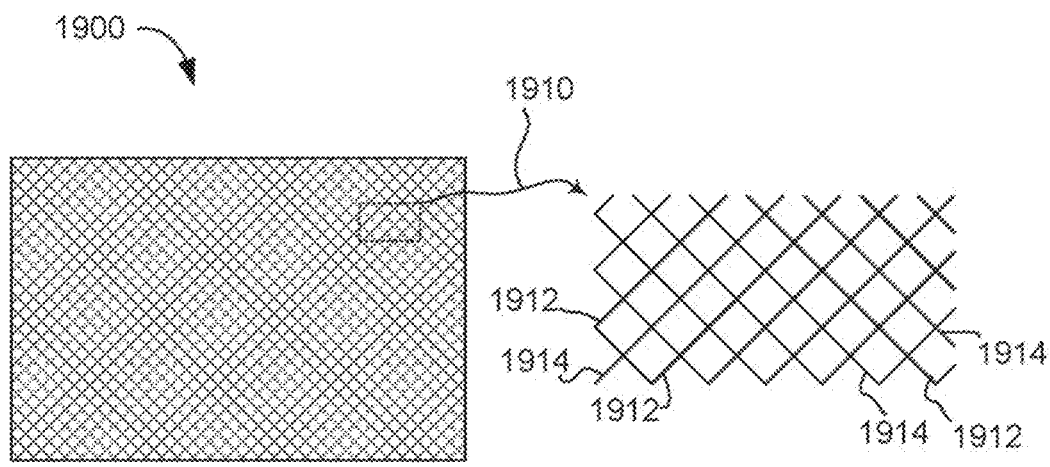
FIGS. 19A-19C show views of an illustrative portion of an asymmetric enhancement layer.
Figure 19B:
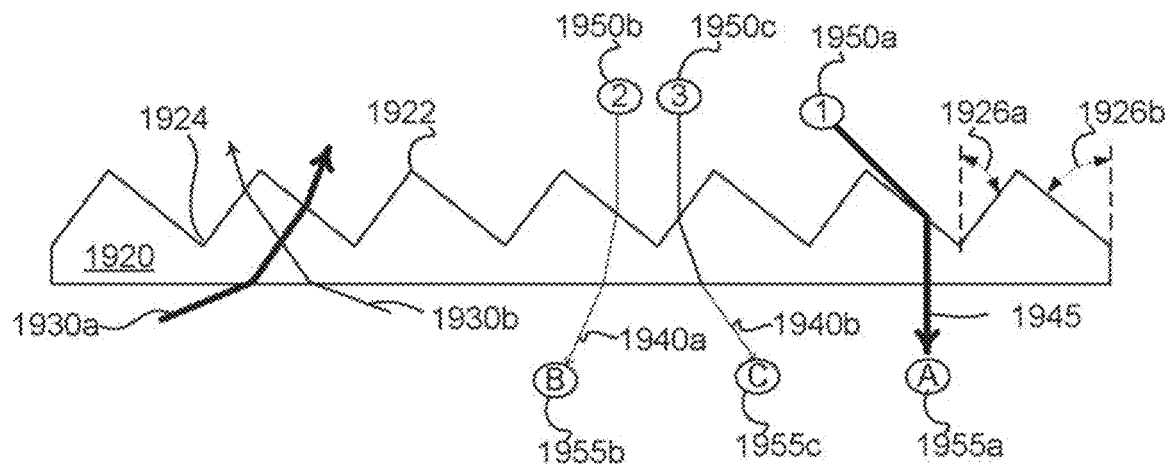
Figure 19C:
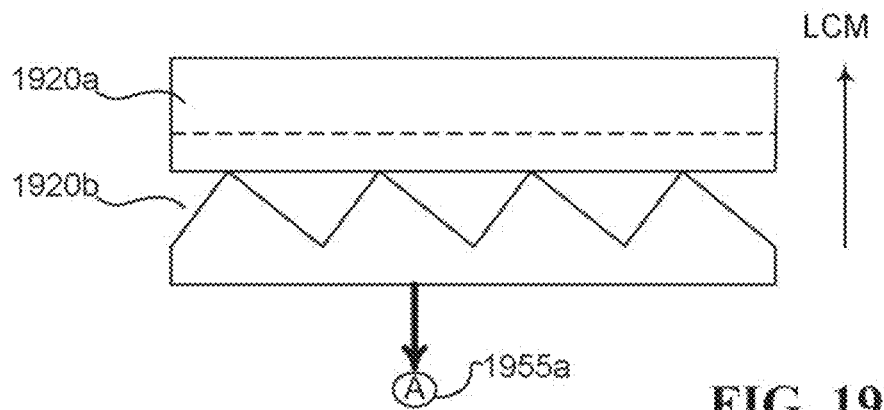

FIGS. 19A-19C show views of an illustrative portion of an asymmetric enhancement layer 1900, according to various embodiments. The asymmetric enhancement layer 1900 can be another embodiment of the enhancement layer 1725. FIG. 19A illustrates a zoomed-in view 1910 of a small portion of the asymmetric enhancement layer 1900. FIG. 19B shows a cross-section of a small portion of one enhancement film layer 1920 of the asymmetric enhancement layer 1900. FIG. 19C shows a cross-section of a small portion of two asymmetric layers 1920a, 1920b of the asymmetric enhancement layer 1900, slacked in orthogonal orientations with respect to each other.

As illustrated, each enhancement film layer 1920 is formed with a series of asymmetric prism structures. Each asymmetric prism structure (micro-prism structure) is generally defined by the cross-section having two angled sides, forming a sharp ridge 1922 and a sharp valley 1924. Each of the two angled sides is slanted at a different respective tilting angle 1926 relative to vertical, as illustrated. Notably, at each extreme of the range of possible tilting angles 1926 is an embodiment in which one of the tilting angles 1926 is at substantially zero degrees, so as to effectively form a saw-tooth-ridge prism structure. In another embodiment, one tilting angle 1926 is 45 degrees, while the other is 52 degrees. In another embodiment, one tilting angle 1926 is 45 degrees, while the other is 54 degrees. In another embodiment, one tilting angle 1926 is 45 degrees, while the other is 56 degrees. In another embodiment, one tilting angle 1926 is 38 degrees, while the other is 52 degrees. In another embodiment, one tilting angle 1926 is 36 degrees, while the other is 54 degrees. As described herein, the tilting angles 1926 are selected to provide a desired type and/or amount of brightness enhancement (e.g., for backlight passing through the enhancement film layer 1920 in the direction of the LCM 1720).

The zoomed-in view 1910 of FIG. 19A shows the two enhancement film layers 1920 of FIG. 19C, stacked in orthogonal orientations with respect to each other, as viewed from the top. As illustrated, the intersecting prism structures form a grid of sharp ridge lines 1912 and sharp valley lines 1914, corresponding respectively to the sharp ridges 1922 and sharp valleys 1924 of each. Such an arrangement results in a top-down view that appears similar to that of the enhancement layer 1800 of FIG. 18, but provides various features that are different from those of the conventional enhancement layer 1800.

FIG. 19B illustrates light traveling through the enhancement film layer 1920 in the direction of the LCM 1720, for example, along light paths 1930. Light generally passing through the enhancement film layer 1920 in the direction of the LCM 1720 (i.e., having an upward directional component with reference to the illustrated orientation), such as those following light paths 1930a and 1930b are bent towards vertical by the angled surfaces of the micro-prism structures Thus, although certain light paths are impacted differently by the asymmetric prism structures than by micro-prism structures of symmetric enhancement layer 1800, the asymmetric enhancement film layer 1920 still provides backlight-enhancement features.

Unlike a symmetric enhancement layer 1800, the asymmetric enhancement film layer 1920 creates less blurring of light traveling in the direction opposite the LCM 1720 (i.e., having a downward directional component with reference to the illustrated orientation). FIG. 19B shows light traveling through the enhancement film layer 1920 in such a direction (e.g., the direction of an under-display optical sensor), for example, along light paths 1940. As illustrated, three objects 1950 are positioned in different locations relative to the asymmetric enhancement film layer 1920. For example, the objects 1950 are fingerprint ridges or valleys of a finger placed on the fingerprint sensing region of a device having the asymmetric enhancement film layer 1920 disposed between an LCM 1720 and an under-display optical fingerprint sensor. Light from the second object 1950b travels along refracted light path 1940a to detection point "B" 1955b (e.g., corresponding to a first potential sensor location), while light from the third object 1950c travels along refracted light path 1940b to detection point "C" 1955c (e.g., corresponding to a second potential sensor location). Notably, while objects 1950b and 1950c are relatively close together, their respective detection points 1955b and 1955c are relatively far apart. Light from the first object 1950a travels along refracted light path 1945 to detection point "A" 1955a, after leaving the asymmetric enhancement film layer 1920 in a substantially vertical direction. It can be seen that configuring the sensor for detection of light exiting along path 1945 (e.g., at detection location 1955a) can yield relatively clear and bright detection information. This is further illustrated in FIG. 19C, in which the two stacked asymmetric enhancement film layers 1920 (in orthogonal orientations with respect to each other) can provide clear image light paths, such as represented by detection point 1955a.

Still, as discussed above with reference to FIGS. 18A-C, avoidance of blurring can involve positioning the optical sensor to receive from only one of the left or right faces of the micro-prism structures. For example, a single optical sensor can be pointed to detect object 1950a and object 1950b via paths 1945 and 1940a, respectively, as both light paths reach the sensor through right prism faces. Still, receiving optical information from only one face of the micro-prism structures can effectively reduce the sensing area that can be practically and accurately imaged without blurring.

Figure 20:
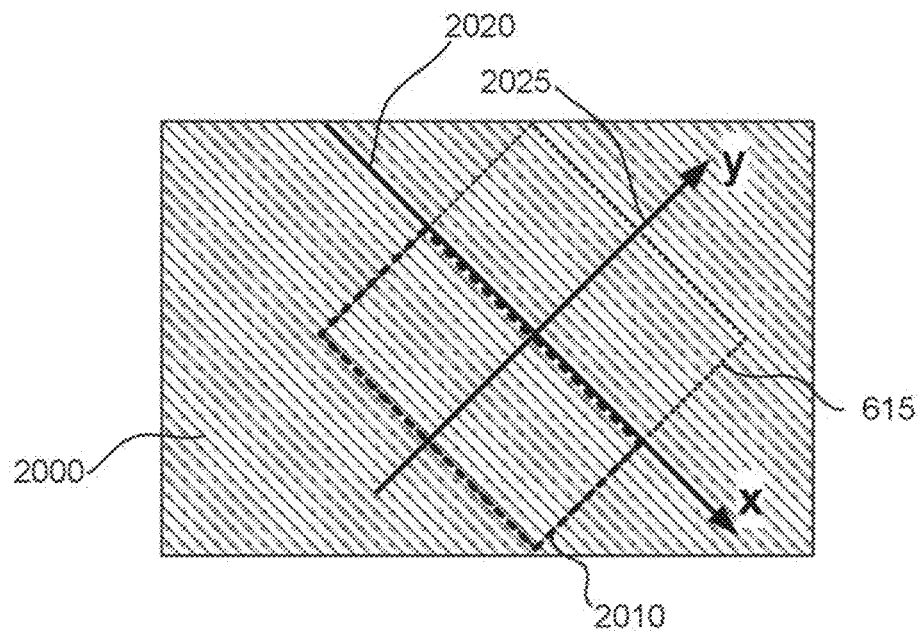
FIG. 20 shows an illustrative fingerprint sensing region overlaid on a single enhancement film layer.

For the sake of illustration, FIG. 20 shows an illustrative fingerprint sensing region 615 overlaid on a single enhancement film layer 2090, such as enhancement film layer 1820 or 1920. As illustrated, the micro-prism structures of the enhancement film layer 2000 form parallel ridge lines running generally in a first direction (labeled as an "X" axis 2020), and running generally orthogonal to a second direction (labeled as a "Y" axis 2025). Though not shown, it can be assumed that a "Z" axis points outward from the page, orthogonal to both the X and Y axes, in the direction of the LCM 1720. As described above, though the theoretical fingerprint sensing region 615 consumes a relatively large sensing area, an optical sensor oriented to sense the entire region can tend to receive reflected probe light from both prism faces of each micro-prism structure, thereby resulting in image blurring. An optical sensor oriented to receive reflected probe light from only one of the prism faces of each micro-prism structure can tend to avoid image blurring, but tends also to result in reducing the sensing region (as illustrated by sensing sub-region 2010). For example, the optical sensor can be oriented to point generally in the negative-Y, positive-Z direction (e.g., {0, −y, z}). In such cases, the practical sensing sub-region 2010 may be approximately half or less the area of the theoretical sensing region 615.

Figure 21:
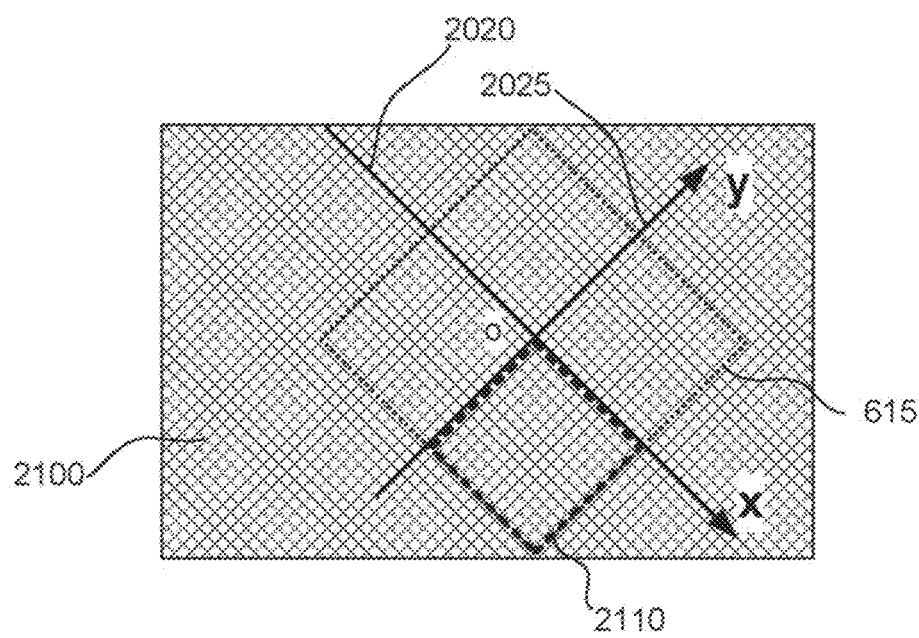
FIG. 21 shows an illustrative fingerprint sensing region overlaid on an enhancement panel having two enhancement film layers, stacked so that their respective micro-prism structures run in generally orthogonal directions.

FIG. 21 shows an illustrative fingerprint sensing region 615 overlaid on an enhancement panel 2100 having two enhancement film layers, stacked so that their respective micro-prism structures run in generally orthogonal directions. The enhancement panel 2100 can be implemented, for example, as enhancement panels shown in FIGS. 18A and 19A, or as the pair of enhancement film layers shown in FIGS. 18C and 190. As illustrated, the enhancement panel 2100 has first micro-prism structures (e.g., of a first enhancement film layer) forming parallel ridge lines running generally in the first direction (along "X" axis 2020), and second micro-prism structures (e.g., of a second enhancement film layer) forming parallel ridge lines running generally in the first second direction (along "Y" axis 2025). With two enhancement film layers, each layer can cause blurring. For example, light passing through one prism face of a microstructure of a lower enhancement film layer is a combination of light passing through both prism faces of a microstructure of an upper enhancement film layer. As such, to avoid blurring, the optical sensor is oriented to receive reflected probe light from only one of the prism faces of each micro-prism structure through both enhancement film layers. For example, the optical sensor can be oriented to point generally in the positive-X, negative-Y, positive-Z direction (e.g., {x, −y, z}). In such cases, the practical sensing sub-region 2110 may be around one-fourth the area of the theoretical sensing region 615. For example, the practical sensing sub-region 2110 may be less than one-fourth the area of the theoretical sensing region 615 when using symmetric micro-prism structures (e.g., like those illustrated in FIGS. 18A-18C), and the practical sensing sub-region 2110 may be a bit more than one-fourth the area of the theoretical sensing region 615 when using well-designed asymmetric micro-prism structures (e.g., like those illustrated in FIGS. 19A-19C).

Increasing the area of the theoretical sensing region 615 can counteract limitations of a reduced-area practical sensing sub-region 2110. For example, doubling the area of the theoretical sensing region 615 can double the area of the practical sensing sub-region 2110. One approach to increasing the area of the theoretical sensing region 615 is to increase the distance between the object being detected (e.g., a fingerprint feature) and a lens at the input of the optical sensor. However, directly increasing such a distance can involve increasing the thickness of the optical sensor, which is impractical in many applications. For example, in smartphone applications, it is desirable to maintain a thin package, while still realizing a large sensing area. Embodiments seek to effectively increase the theoretical sensing region 615 without a comparable increase in sensor thickness by using refraction and reflection to produce a folded light path.

Figure 22:
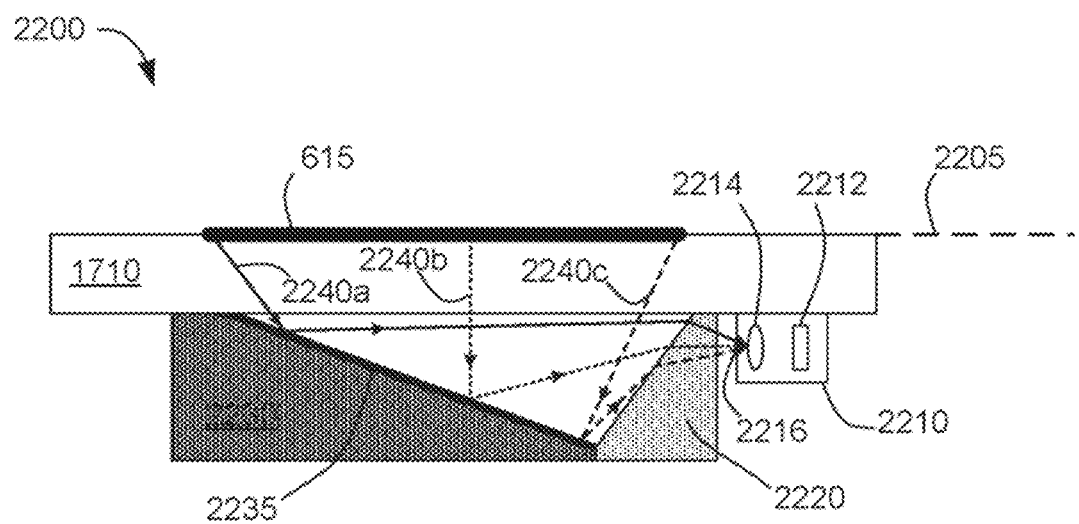
FIG. 22 shows an illustrative under-display optical sensing environment, according to various embodiments.

FIG. 22 shows an illustrative under-display optical sensing environment 2200, according to various embodiments. As illustrated, the environment 2200 includes an under-display optical sensing system disposed below a display module 1710. The optical sensing system includes an optical sensing module 2210, a refractive structure 2220, and a reflective structure 2230. The optical sensing module 2210 can include any suitable components for optical sensing. For the sake of simplicity, the optical sensing module 2210 is shown as an optical detector 2212 and a lens 2214. For reference, the display module 1710 is illustrated as defining a display plane 2205. For example, a display surface of the display module 1710 is generally flat (e.g., though it may include bezeled edges, rounded edges, etc.), such that the display surface lies generally in the display plane 2205. The display module 1710 can be any suitable type of display and can include one or more layers. In some embodiments, as described above, the display module 1710 is a liquid crystal display (LCD) module having layers including a LCD layer (e.g., including an array of LCD pixels, electrode interconnects, etc.).

The optical sensing module 2210 is configured to derive optical information from received illumination energy. For example, as light enters the optical sensing module 2210 through an input aperture 2216, the light is focused by the lens 2214 onto the optical detector 2212, which may include an array of photodetectors, and/or any other suitable components. The received illumination energy can then be converted into optical information. For example, the conversion can include any suitable optical processing (e.g., using lenses, filters, modulators, masks, etc.) and/or any suitable logical processing (e.g., using computational processors, state machines, software, etc.). The input aperture 2216 can be oriented substantially parallel to the display plane 2205, as illustrated. In such a configuration, a light path traveling parallel to the display plane 2205 can enter a center of the input aperture 2216 on-axis with the lens 2214.

The reflective structure 2230 can receive reflected probe light passing through the display module 1710 (e.g., within an optical sensing region 615) and can. In some embodiments, the reflective structure 2230 includes a mirror integrated with (e.g., affixed to) a top reflective surface 2235. For example, the reflective structure 2230 comprises structure to support and orient the mirror in an angle suitable for redirecting light paths 2240 of the reflected probe light toward the refractive structure 2220. In other embodiments, the reflective structure 2230 is a unitary prismatic body having an angled top surface 2235. In such embodiments, the unitary prismatic body can be made of a material (e.g., plastic, glass, etc. (having an index of refraction selected to reflect the reflected probe light that is incident on the angled top surface 2235 after passing through the display module 1710 toward the refractive structure 2220. As illustrated, the reflective structure 2230 is sized and oriented to redirect light paths 2240 of the reflected probe light from across the entire optical sensing region 615 toward the refractive structure 2220. In certain implementations, the reflective structure 2230 is sized and oriented to redirect light paths 2240 of the reflected probe light only from a portion of the optical sensing region 615, and/or additionally from areas outside the optical sensing region 615.

Embodiments of the refractive structure 2220 receive the reflected probe light from the reflective structure 2230 and bend the light paths 2240 of the reflected probe light to converge on the input aperture 2216 of the optical sensing module 2210. For example, as illustrated, light paths 2240a, 2240b, and 2240c originate from a leftmost edge, a center, and a rightmost edge of the optical sensing region 615, respectively, thereby representing light paths 2240 from across the entire optical sensing region 615. Though covering a large optical sensing region 615, the light paths 2240 are all redirected to the refractive structure 2220 by the reflective structure 2230, and are all hem by the refractive structure 2220 to converge on the input aperture 2216 of the optical sensing module 2210. In some embodiments, the refractive structure 2220 is a unitary prismatic body having a first refractive surface (e.g., further from the optical sensing module 2210) to receive the reflected probe light from the reflective structure, and a second refractive surface (e.g., closer to the optical sensing module 2210) to transmit the reflected probe light to the input aperture of the optical sensing module, the first refractive surface being angled with respect to the second refractive surface. For example, as illustrated, the second refractive surface can be oriented substantially orthogonally to the display plane.

As described above (though not shown in FIG. 22), embodiments can include an illumination source and a top transparent layer. The illumination source can be disposed under the display module 1710 to generate probe light and to direct the probe light through at least a portion of the display module 1710. For example, the probe light source can include a light emitting diode (LED), a vertical cavity surface emitting laser (VCSEL), or any other suitable light source. The top transparent layer can be disposed above the display module 1710 and configured as an output interface for images produced by the display module 1710. In some implementations, the display module 1710 also includes touch-sensitive features, and the top transparent layer can be further configured as an input interlace for touch-sensitive interactions. Though the optical sensing region 615 is illustrated as laying substantially in the display plane 2205, the optical sensing region 615 can also be defined with reference to a top surface of the top transparent layer. For example, when the optical sensing module 2210 is configured for under-display optical fingerprint sensing, the fingerprint is typically placed on the top surface of the top transparent layer, such that the optical sensing region 615 corresponds more directly to the region of the top surface of the top transparent layer within which optical fingerprint sensing can be performed. The optical sensing region 615, then, can be a region configured to receive the probe light from the illumination source and to reflect a portion of the probe light responsive to interactions between an object (e.g., fingerprint features) and the top surface. For example, as described above, the top transparent layer can be made of a material (e.g., treated glass) having a particular index of refraction relative to the air above the top transparent layer and/or to a fingerprint feature or other object. As such, the probe light will tend to be reflected or not at the top surface of the top transparent layer based on whether or not an object is present (e.g., a fingerprint ridge will cause the probe light to be reflected, and a fingerprint valley will cause the probe light to be absorbed, scattered, etc.). In such embodiments, the reflected probe light being redirected by the reflective structure 2230, bent by the refractive structure 2220, and received by the optical sensing module 2210 is the probe light being reflected by the top surface of the top transparent layer.

In some embodiments, the reflective structure 2230 and the refractive structure 2220 are configured (e.g., sized, shaped, positioned, and oriented) so that one of the light paths 2240*b* passing through a center of the optical sensing region 615 is redirected by the reflective structure 2230 and bent by the refractive structure 2220 so as to enter a center of the input aperture 2216 of the optical sensing module. For example, the lens 2214 is a convex lens having a primary optical axis, and the input aperture 2216 is aligned with the lens 2214, so that a center of the input aperture 2216 is aligned with the primary optical axis of the lens 2214. In some embodiments, as illustrated, the reflective structure 2230 and the refractive structure 2220 are configured so that one of the light paths 2240*b* passing through the display module in a first direction substantially normal to the display plane (e.g., vertical with respect to the illustration) is redirected by the reflective structure 2230 and bent by the refractive structure 2220 so as to enter the input aperture 2216 of the optical sensing module 2210 in a second direction substantially parallel to the display plane (e.g., horizontal with respect to the illustration).

Figure 23:
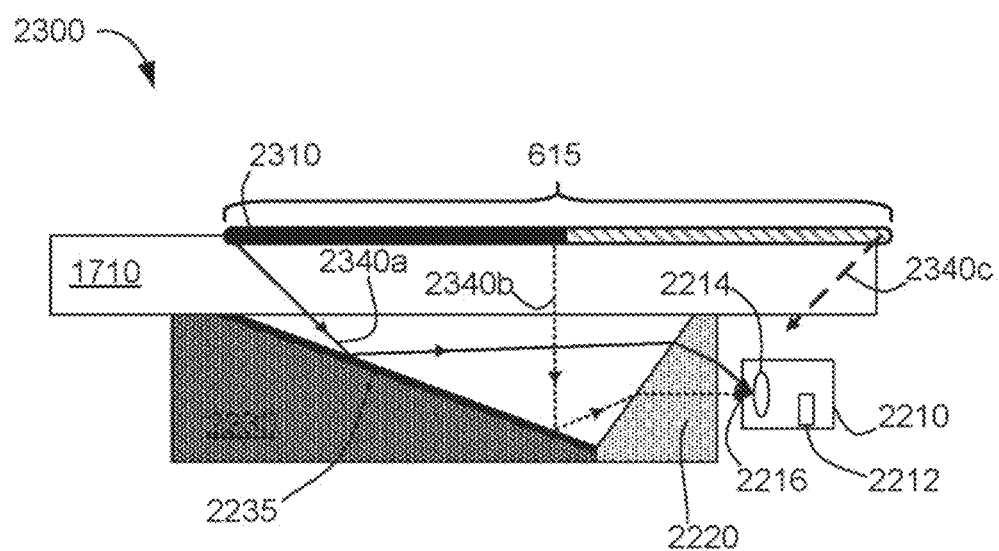
FIG. 23 shows an illustrative under-display optical sensing environment with off-axis sensing, according to various embodiments.

FIG. 23 shows an illustrative under-display optical sensing environment 2300 with off-axis sensing, according to various embodiments. Similar to the environment 2200 of FIG. 22, the environment 2300 includes an under-display optical sensing system disposed below a display module 1710. The optical sensing system includes an optical sensing module 2210, a refractive structure 2220, and a reflective structure 2230 (with a reflective top surface 2235. The optical sensing module 2210 can include any suitable components for optical sensing, such as an optical detector 2212 and a lens 2214. Unlike in FIG. 22, the environment 2300 of FIG. 23 shows a practical optical sensing sub-region 2310 smaller than the theoretical optical sensing region 615, such as described with reference to FIGS. 20 and 21.

As described above, embodiments of the display module 1710 can include an enhancement layer having micro-prism structures. For example, each micro-prism structures can have at least a first and second prism face, and the first and second prism faces can be symmetric or asymmetric with respect to each other. As reflected probe light passed through the micro-prism structures, some of the reflected probe light passes through the first prism faces of the micro-prism structures, and other of the reflected probe light passes through the second prism faces of the micro-prism structures. For example, a first portion of light paths 2540 of the reflected probe light pass through first prism faces of the micro-prism structures, and a second portion of the light paths 2340 of the reflected probe light pass through second prism faces of the micro-prism structures, such that the first and second portions of the light paths 2340 are divergent. As described above, such divergence can cause blurring if the optical sensing module 2210 receives both the first and second portions of the light paths 2340. Instead, embodiments can configure the optical sensing module 2210 to derive the optical information from the received illumination energy corresponding only to the first portion of the light paths 2340 of the reflected probe light. As such, the practical optical sensing sub-region 2310 smaller than the theoretical optical sensing region 615 (e.g., approximately one half or one quarter the area).

In some such embodiments, the enhancement layer includes a first enhancement film layer and a second enhancement film layer. The first enhancement film layer has a first portion of the micro-prism structures arranged to form first parallel prism ridge lines running in a first direction, and the second enhancement film layer has a second portion of the micro-prism structures arranged to form second parallel prism ridge lines running in a second direction different from the first direction. For example, as illustrated in FIG. 21, the first enhancement film layer can be substantially identical to the second enhancement film layer, and the first enhancement film layer can be slacked on top of die second enhancement film layer and oriented so that the first direction is orthogonal to the second direction. In some such embodiments, the first portion of the light paths 2340 of the reflected probe light pass through the first prism faces of the micro-prism structures by passing through first prism faces of the first portion of micro-prism structures and first prism faces of the second portion of micro-prism structures; and the second portion of the light paths 2340 of the reflected probe light pass through the second prism faces of the micro-prism structures by passing through second prism faces of the first portion of micro-prism structures and second prism faces of the second portion of micro-prism structures There can also be a third portion of the light paths 2340 of the reflected probe light that pass through the first prism faces of the first portion of micro-prism structures and the second prism faces of the second portion of micro-prism structures, and a fourth portion of the light paths 2340 of the reflected probe light that pass through the second prism faces of the first portion of micro-prism structures and the first prism faces of the second portion of micro-prism structures. Again, in such embodiments, the practical optical sensing sub-region 2310 can be smaller than the theoretical optical sensing region 615 (e.g., approximately only one quadrant of the theoretical optical sensing region 615 may be usable without blurring).

Embodiments of the optical sensing module 2210 include the lens 2214 and the optical detector 2212 (e.g., including any suitable type of sensing components), oriented so that the reflected probe light caused to converge on the input aperture 2216 of the optical sensing module 2210 is focused onto the optical detector 2212 by the lens 2214. Some such embodiments can be configured to prefer the first portion of the light paths 2340 that correspond to the illumination energy passing only (or primarily) through a particular face of the micro-prism structures (e.g., only first prism faces). For example, as illustrated in FIG. 23, the under-display optical sensing system is configured so that light path 2340a and light path 2340b are directed into the optical sensing module 2210y the reflective structure 2230 and the refractive structure 2220, but light path 234c is not. In some such embodiments, the optical detector 2212 can be positioned off-axis from the lens in accordance with a generally off-center light path resulting from a configured preference only for the first portion of the light paths 2340. As such, the optical detector 2212 can be configured (e.g., positioned and/or sized) to receive illumination energy reflecting from the practical optical sensing sub-region 2310, and not from the rest of the theoretical optical sensing region 615.

While this disclosure contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

A recitation of "a", "an" or "the" is intended to mean "one or more" unless specifically indicated to the contrary. Ranges may be expressed herein as from "about" one specified value, and/or to "about" another specified value. The term "about" is used herein to mean approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. When such a range is expressed, another embodiment includes from the one specific value and/or to the other specified value. Similarly, when values are expressed as approximations, by use of the antecedent "about," it will be understood that the specified value forms another embodiment. It will be further understood that the endpoints of each of the ranges are included with the range.

All patents, patent applications, publications, and descriptions mentioned here are incorporated by reference in their entirety for all purposes. None is admitted to be prior art.

What is claimed is:

1. An electronic device comprising:
a display module that defines a display plane; and
an under-display optical sensing system positioned below the display module and comprising:
an optical sensing module having an input aperture oriented substantially parallel to the display plane, the optical sensing module to derive optical information from received illumination energy;
a refractive structure; and
a reflective structure to receive reflected probe light passing through the display module and to redirect light paths of the reflected probe light toward the refractive surface,
wherein the refractive structure is to receive reflected probe light from the reflective structure and to bend the light paths of the reflected probe light to converge on the input aperture of the optical sensing module.

2. The electronic device of claim 1, wherein the refractive structure and the reflective structure are configured so that one of the light paths passing through the display module in a first direction substantially normal to the display plane is redirected by the reflective structure and bent by the refractive structure so as to enter the input aperture of the optical sensing module in a second direction substantially parallel to the display plane.

3. The electronic device of claim 1, wherein the refractive structure is a unitary prismatic body having a first refractive surface to receive the reflected probe light from the reflective structure, and a second refractive surface to transmit the reflected probe light to the input aperture of the optical sensing module, the first refractive surface being angled with respect to the second refractive surface.

4. The electronic device of claim 3, wherein the second refractive surface is oriented substantially orthogonally to the display plane.

5. The electronic device of claim 1, wherein the reflective structure is a unitary prismatic body having an angled top surface, the unitary prismatic body having an index of refraction selected to reflect the reflected probe light that is incident on the angled top surface after passing through the display module.

6. The electronic device of claim 1, wherein the reflective structure comprises a mirror.

7. The electronic device of claim 1, further comprising:
an illumination source disposed under the display module to generate probe light and to direct the probe light through at least a portion of the display module; and
a top transparent layer disposed above the display module and configured as an output interface for images produced by the display module and having an optical sensing region configured to receive the probe light from the illumination source, the top transparent layer configured so that a portion of the probe light is reflected by a top surface of the top transparent layer responsive to interactions between an object and the top surface, the reflected probe light being the portion of the probe light that is reflected by the top surface.

8. The electronic device of claim 7, wherein the refractive structure and the reflective structure are configured so that one of the light paths passing through a center of the optical sensing region is redirected by the reflective structure and bent by the refractive structure so as to enter a center of the input aperture of the optical sensing module.

9. The electronic device of claim 1, wherein the optical sensing module comprises a lens and an optical sensor, oriented so that the reflected probe light caused to converge on the input aperture of the optical sensing module is focused onto the optical sensor by the lens.

10. The electronic device of claim 1, wherein:
the display module further comprises an enhancement layer having a plurality of micro-prism structures;
a first portion of the light paths of the reflected probe light pass through first prism faces of the plurality of micro-prism structures;
a second portion of the light paths of the reflected probe light pass through second prism faces of the plurality of micro-prism structures, such that the first and second portions of the light paths are divergent; and
the optical sensing module is configured to derive the optical information from the received illumination energy corresponding only to the first portion of the light paths of the reflected probe light.

11. The electronic device of claim 10, wherein:
the enhancement layer includes a first enhancement film layer and a second enhancement film layer, the first enhancement film layer having a first plurality of the micro-prism structures arranged to form a first plurality of parallel prism ridge lines running in a first direction, the second enhancement film layer having a second plurality of the micro-prism structures arranged to form a second plurality of parallel prism ridge lines running in a second direction different from the first direction;
the first portion of the light paths of the reflected probe light pass through the first prism faces of the plurality of micro-prism structures by passing through first prism faces of the first plurality of micro-prism structures and first prism faces of the second plurality of micro-prism structures;
the second portion of the light paths of the reflected probe light pass through the second prism faces of the plurality of micro-prism structures by passing through second prism faces of the first plurality of micro-prism structures and second prism faces of the second plurality of micro-prism structures;
a third portion of the light paths of the reflected probe light pass through the first prism faces of the first plurality of micro-prism structures and the second prism faces of the second plurality of micro-prism structures; and
a fourth portion of the light paths of the reflected probe light pass through the second prism faces of the first plurality of micro-prism structures and the first prism faces of the second plurality of micro-prism structures.

12. The electronic device of claim 11, wherein:
the first enhancement film layer is substantially identical to the second enhancement film layer; and
the first enhancement film layer is stacked on top of the second enhancement film layer and oriented so that the first direction is orthogonal to the second direction.

13. The electronic device of claim 10, wherein:
the optical sensing module comprises a lens and an optical sensor, oriented so that the reflected probe light caused to converge on the input aperture of the optical sensing module is focused onto the optical sensor by the lens;
the first portion of the light paths correspond to an off-center light path relative to the lens; and
the optical sensor is positioned off-axis from the lens in accordance with the off-center light path to receive illumination energy corresponding primarily to the first portion of the light paths.

14. The electronic device of claim 10, wherein the plurality of micro-prism structures comprise symmetric micro-prism structures.

15. The electronic device of claim 10, wherein the plurality of micro-prism structures comprise asymmetric micro-prism structures.

16. The electronic device of claim 1, wherein the display module is a liquid crystal display (LCD) module having a plurality of layers including a LCD layer.

17. The electronic device of claim 1, wherein the electronic device is a smartphone.

18. An under-display optical sensing system for installation under a display module that defines a display plane, the system comprising:
an optical sensing module having an input aperture oriented substantially parallel to the display plane, the optical sensing module to derive optical information from received illumination energy;
a refractive structure; and
a reflective structure,
the reflective structure and the refractive structure arranged with respect to each other and to the optical sensing module, such that light paths of reflected probe light passing through an optical sensing region of the display module is redirected by the reflective structure toward the refractive surface, and bent by the refractive structure to converge on the input aperture of the optical sensing module.

19. The system of claim 18, wherein:
the optical sensing module comprises a lens and an optical sensor, oriented so that the reflected probe light caused to converge on the input aperture of the optical sensing module is focused onto the optical sensor by the lens.

20. The system of claim 19, wherein:
the optical sensing module is to derive optical information from received illumination energy corresponding to a portion of the light paths of the reflected probe light passing through a particular sub-region of the optical sensing region; and
the optical sensor is positioned off-axis from the lens to receive the illumination energy via an off-center light path relative to the lens.

21. The system of claim 20, wherein:
the particular sub-region corresponds approximately to one quadrant of the optical sensing region.

* * * * *